(12) United States Patent
Hatfield et al.

(10) Patent No.: US 11,828,374 B2
(45) Date of Patent: Nov. 28, 2023

(54) VALVE

(71) Applicant: TTP Ventus Ltd., Melbourn (GB)

(72) Inventors: Stuart Hatfield, Melbourn (GB); James Samuel Bumby, Melbourn (GB)

(73) Assignee: TTP VENTUS LTD., Melbourn (GB)

( * ) Notice: Subject to any disclaimer, the term of this patent is extended or adjusted under 35 U.S.C. 154(b) by 0 days.

(21) Appl. No.: 17/299,732

(22) PCT Filed: Dec. 6, 2019

(86) PCT No.: PCT/GB2019/053459
§ 371 (c)(1),
(2) Date: Jun. 3, 2021

(87) PCT Pub. No.: WO2020/128426
PCT Pub. Date: Jun. 25, 2020

(65) Prior Publication Data
US 2022/0018458 A1 Jan. 20, 2022

(30) Foreign Application Priority Data

Dec. 7, 2018 (GB) ...................................... 1820025
Jan. 23, 2019 (GB) ...................................... 1900952

(51) Int. Cl.
*F16K 15/14* (2006.01)
*F04B 53/10* (2006.01)
*F16K 27/02* (2006.01)

(52) U.S. Cl.
CPC ........ *F16K 15/144* (2013.01); *F04B 53/1067* (2013.01); *F16K 27/0209* (2013.01)

(58) Field of Classification Search
CPC . F16K 15/144; F16K 27/0209; F04B 53/1067
See application file for complete search history.

(56) References Cited

U.S. PATENT DOCUMENTS 3,670,071 A * 6/1972 Walchle .............. F16K 27/0209
264/273
6,309,194 B1 10/2001 Fraser et al.
(Continued)

FOREIGN PATENT DOCUMENTS

CH 597544 A5 4/1978
CN 2549207 Y 5/2003
(Continued)

OTHER PUBLICATIONS

International Search Report and Written Opinion for International Application No. PCT/GB2019/053458, dated Feb. 19, 2020.
(Continued)

*Primary Examiner* — P. Macade Nichols
(74) *Attorney, Agent, or Firm* — CANTOR COLBURN LLP

(57) ABSTRACT

A valve includes a first plate, a second plate, a spacer disposed between the first plate and the second plate, and a flap movably disposed between the first plate and the second plate. The first plate includes a plurality of first holes extending through said first plate and the second plate includes a plurality of second holes extending through said second plate. The second holes are substantially offset from the first holes. The spacer forms a cavity between the first plate and the second plate and is in fluid communication with the first holes and the second holes. The flap has holes substantially offset from the first holes and substantially aligned with the second holes, and the flap is operable to be motivated between said first and second plates in response to a change in direction of the differential pressure of the fluid across the valve.

20 Claims, 22 Drawing Sheets

(56) References Cited

U.S. PATENT DOCUMENTS

| | | |
|---|---|---|
| 8,646,479 B2 | 2/2014 | Jaeb et al. |
| 10,598,192 B2 | 3/2020 | Bukland et al. |
| 2004/0120836 A1 | 6/2004 | Dai et al. |
| 2007/0026269 A1* | 2/2007 | Nakakubo ............ F16K 99/0001 137/859 |
| 2007/0242427 A1 | 10/2007 | Yamamoto et al. |
| 2009/0015097 A1 | 1/2009 | Meng et al. |
| 2009/0092503 A1* | 4/2009 | Meng .................... F16K 15/144 417/322 |
| 2009/0277166 A1* | 11/2009 | Walz ...................... F02M 26/70 60/324 |
| 2010/0290935 A1 | 11/2010 | Richter et al. |
| 2013/0276906 A1* | 10/2013 | Locke .................... F16K 15/14 137/15.01 |
| 2020/0332790 A1 | 10/2020 | Tanaka |
| 2020/0371536 A1 | 11/2020 | Tanaka et al. |
| 2021/0003266 A1 | 1/2021 | Yokoi et al. |
| 2022/0010791 A1 | 1/2022 | Deeks et al. |
| 2022/0018458 A1 | 1/2022 | Hatfield et al. |
| 2022/0057019 A1 | 2/2022 | Hatfield et al. |

FOREIGN PATENT DOCUMENTS

| | | |
|---|---|---|
| CN | 1455107 A | 11/2003 |
| CN | 102638166 A | 8/2012 |
| CN | 106787898 A | 5/2017 |
| EP | 042087 A1 | 4/1991 |
| GB | 2576796 A | 3/2020 |
| GB | 2577710 A | 4/2020 |
| JP | S57171460 U | 10/1982 |
| JP | 2008002387 A | 1/2008 |
| JP | 2009079482 A | 4/2009 |
| JP | 2014238012 A | 12/2014 |
| WO | WO2006/111775 | 10/2006 |
| WO | WO2009/152775 | 12/2009 |
| WO | WO2010/139917 | 12/2010 |
| WO | WO2010/139918 | 12/2010 |
| WO | WO2012/061044 | 5/2012 |
| WO | WO2013/117945 | 8/2013 |
| WO | WO2013/134056 | 9/2013 |
| WO | WO2015/173280 | 11/2015 |
| WO | WO2018/049060 | 3/2018 |
| WO | WO2020/070498 | 4/2020 |
| WO | WO2020/115502 | 6/2020 |

OTHER PUBLICATIONS

Combined Search and Examination Report for GB Application No. GB1820025.3, dated May 14, 2019.
International Search Report and Written Opinion for International Application No. PCT/GB2019/053459, dated Feb. 19, 2020.
Combined Search and Examination Report for GB Application No. GB1900952.1, dated Mar. 27, 2019.
Examination Report for GB Application No. GB1900952.1, dated Nov. 12, 2020.
International Search Report and Written Opinion for International Application No. PCT/GB2019/052789, dated Jan. 3, 2020.
Search Report for GB Application No. GB1816156.2, dated Mar. 29, 2019.
Combined Search and Examination Report for GB Application No. GB2012420.2, dated Jan. 6, 2021.
Non-Final Office Action dated Apr. 13, 2023; U.S. Appl. No. 17/299,708; filed Jun. 3, 2021 (18 pgs).

* cited by examiner

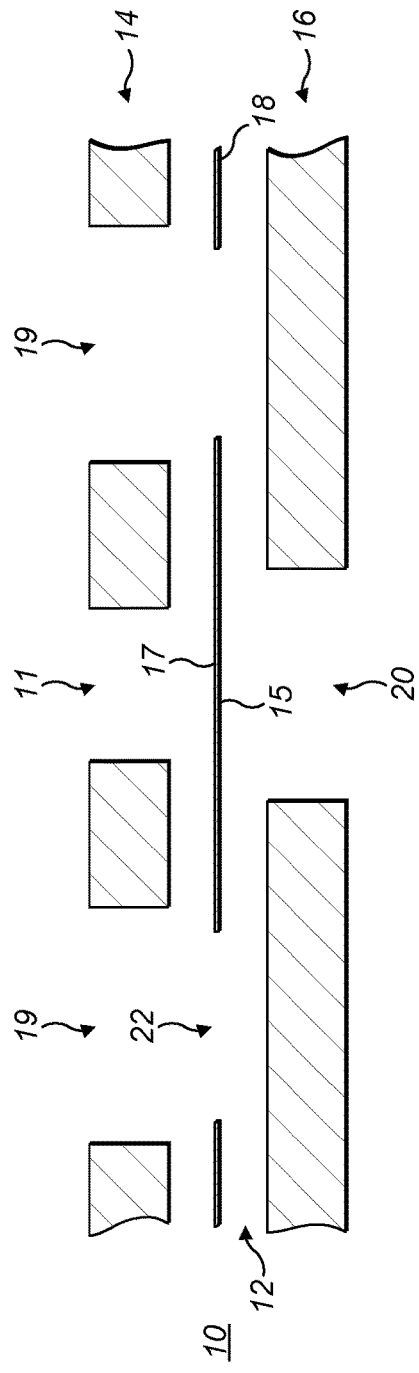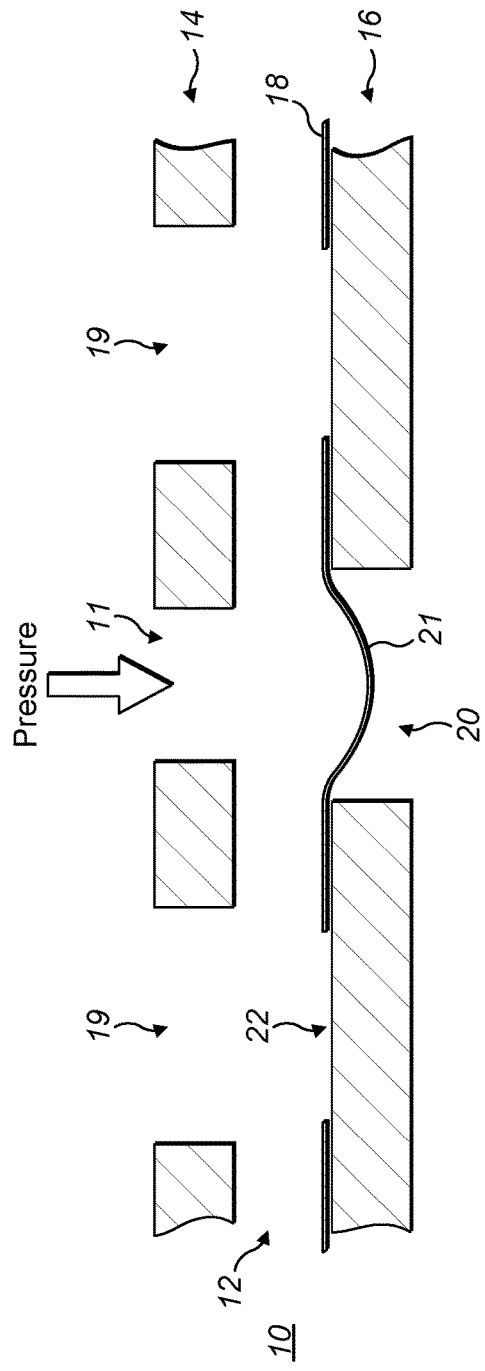

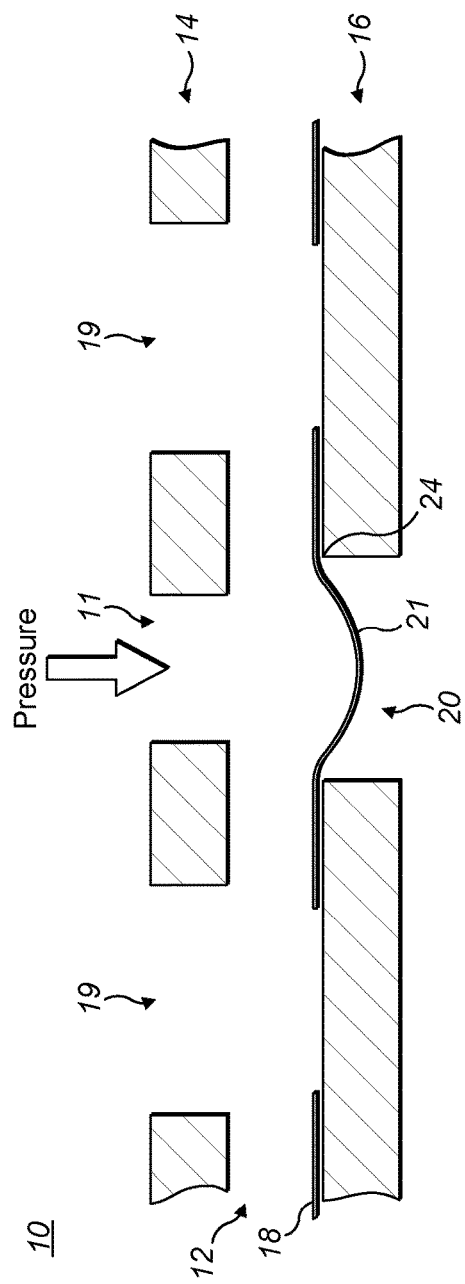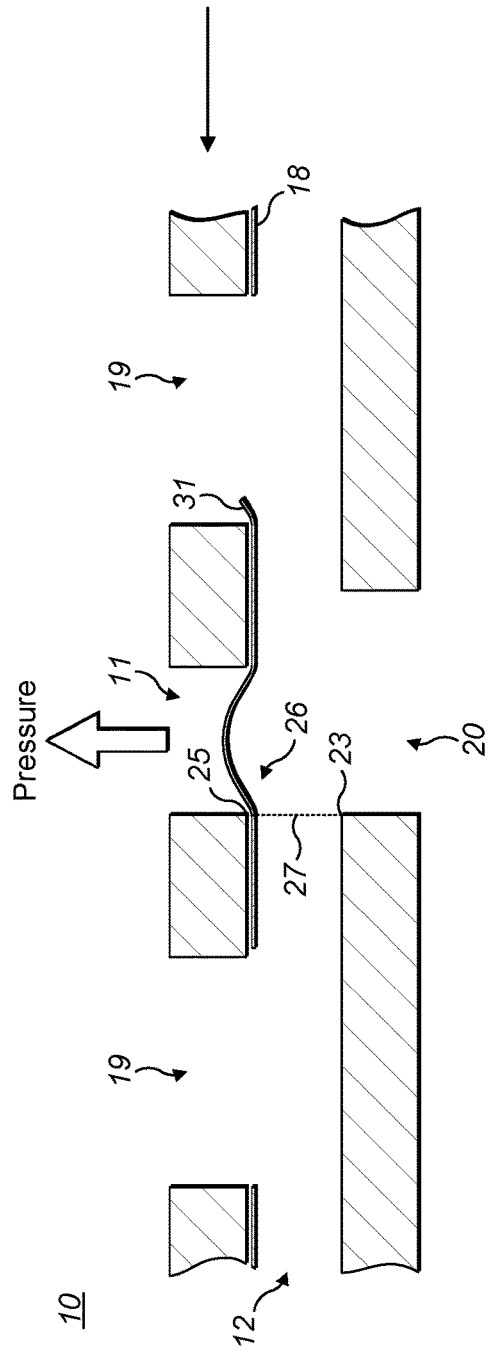

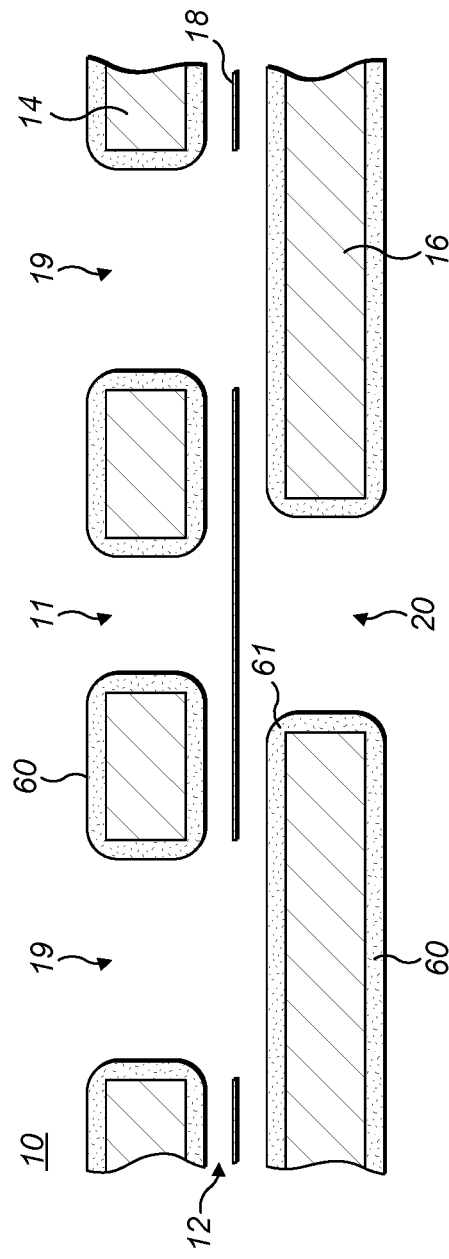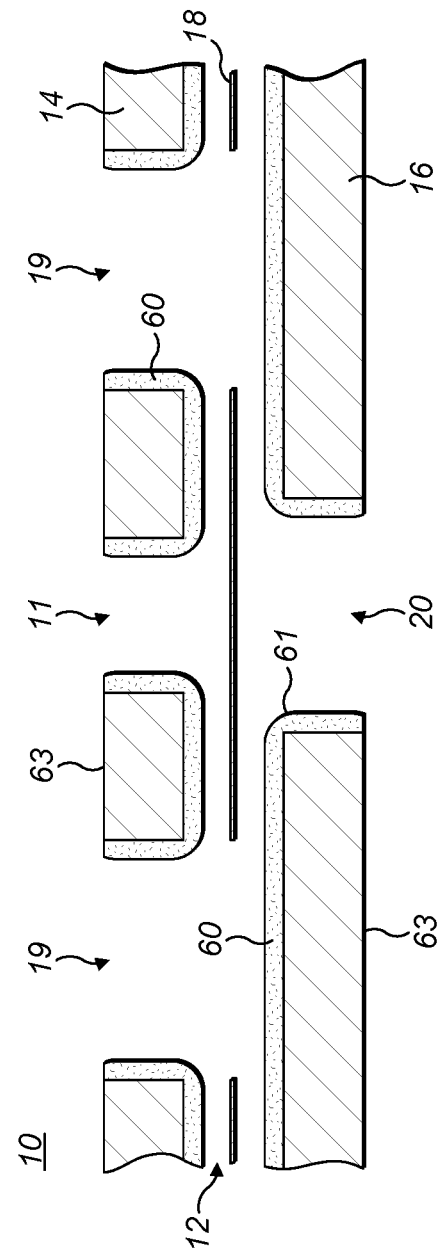

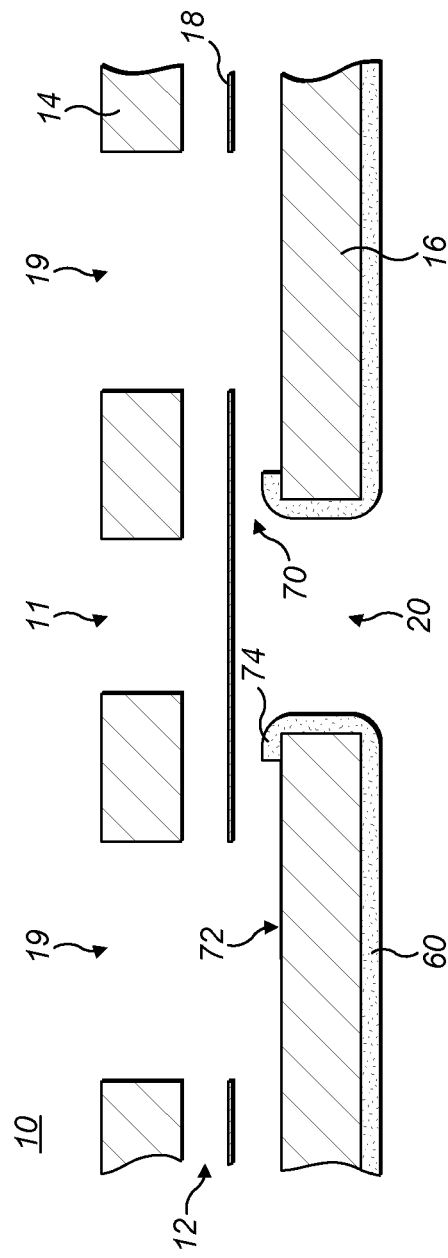
FIG. 9A
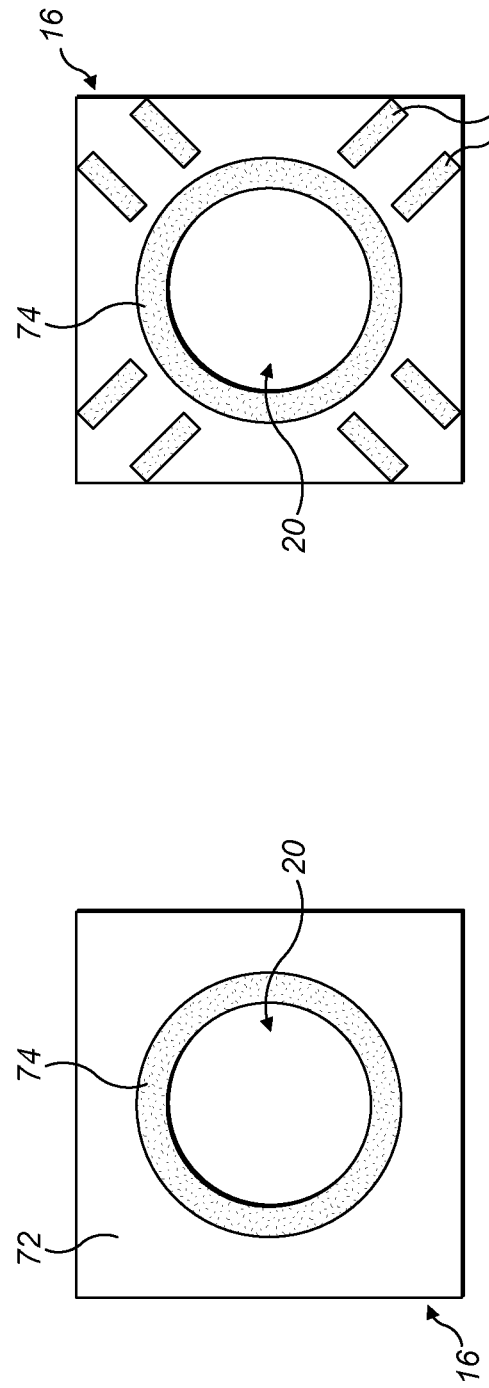
FIG. 9B
FIG. 9C

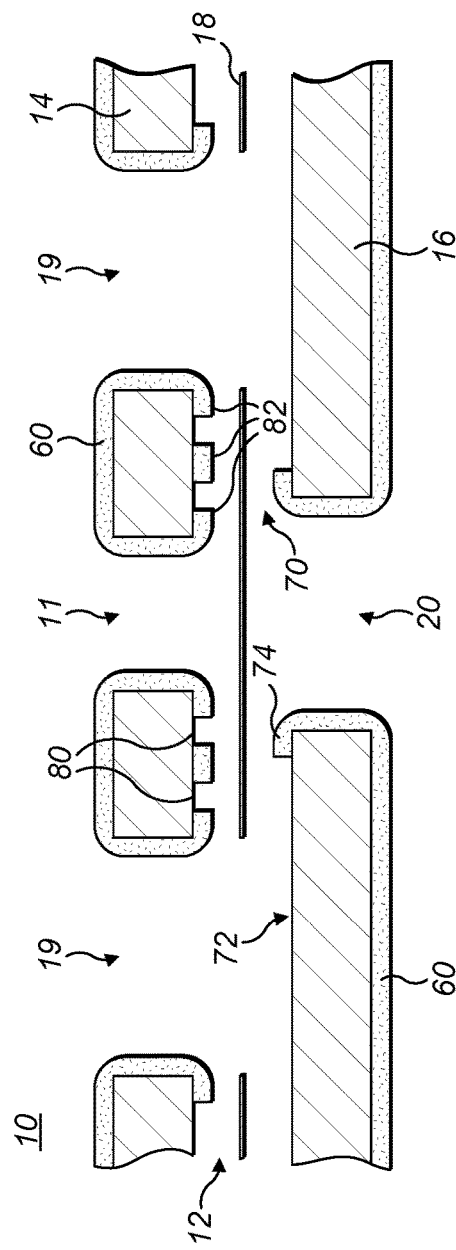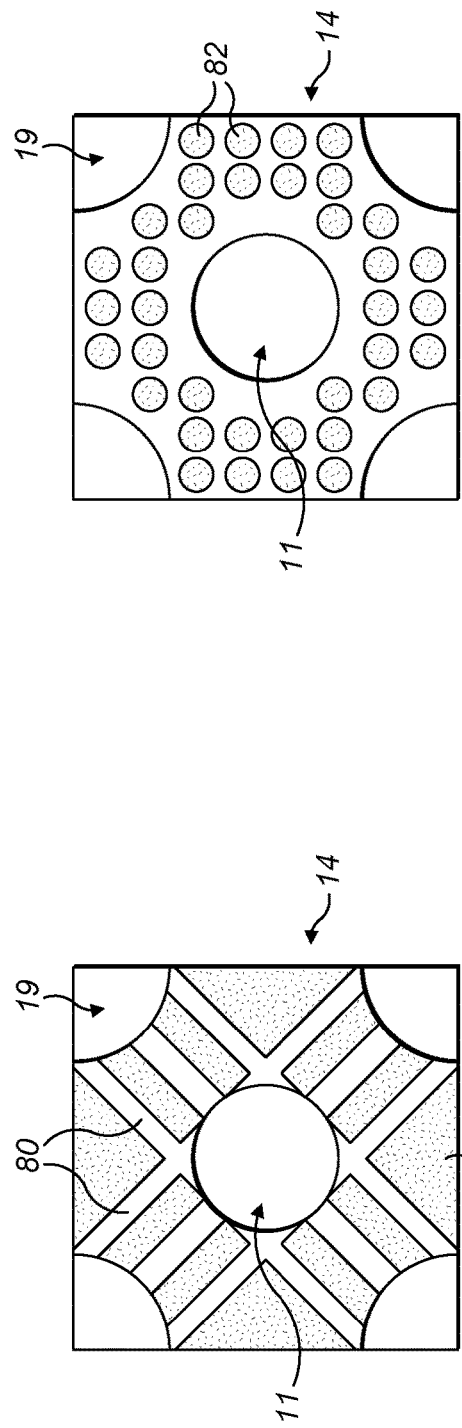
FIG. 10A
FIG. 10B
FIG. 10C

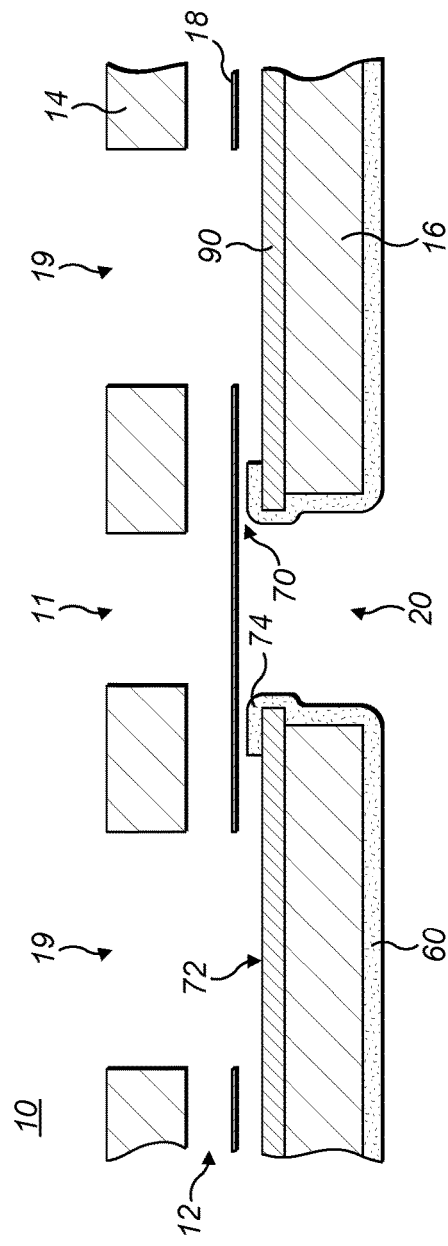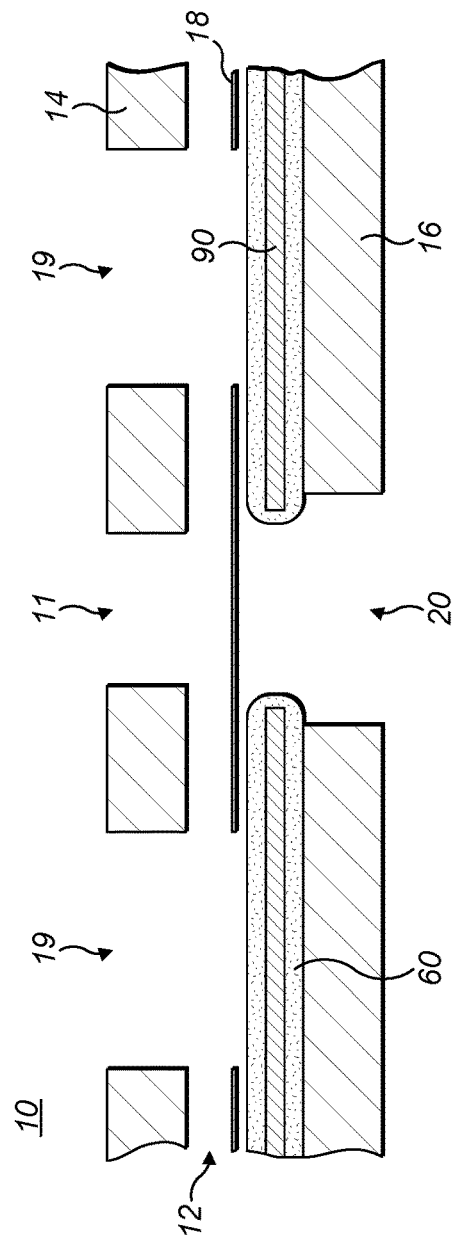

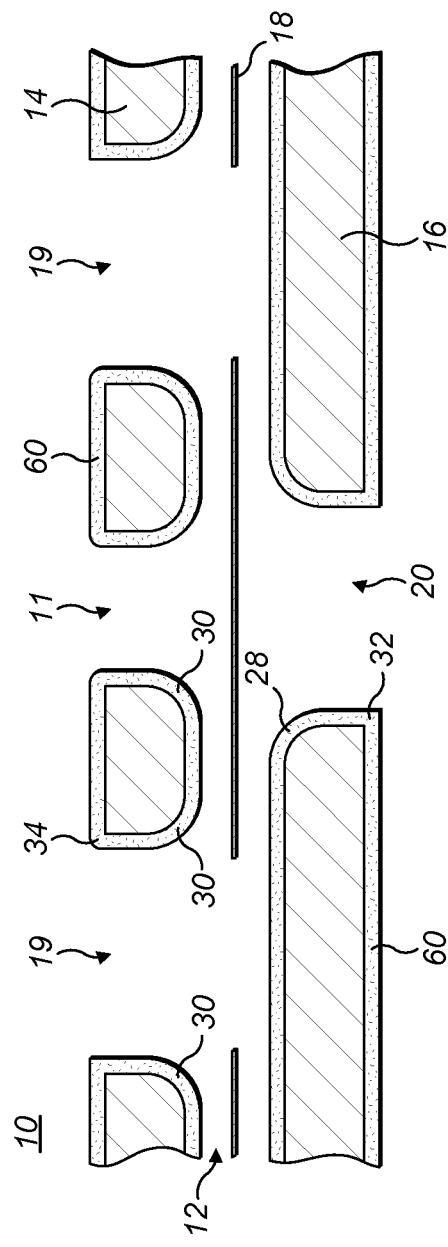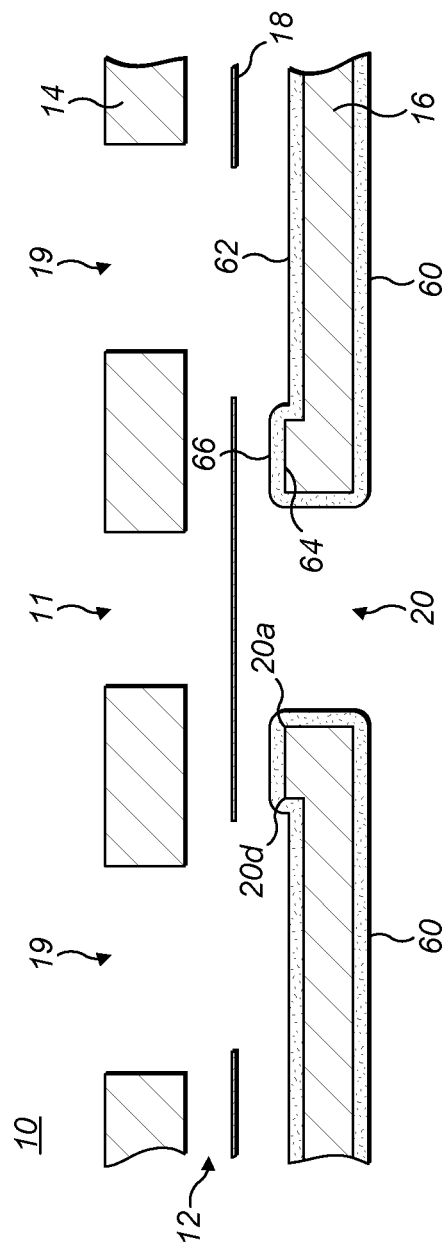

VALVE

CROSS-REFERENCE TO RELATED APPLICATIONS

This application is a U.S. national stage filing under 35 U.S.C. § 371 of International Application No. PCT/GB2019/053459, entitled "Improved valve," filed Dec. 6, 2019, which claims priority to GB Application No. 1820025.3, entitled "Improved valve," filed Dec. 7, 2018, and GB Application No. 1900952.1, entitled "Improved valve," filed Jan. 23, 2019, each of which are incorporated herein by reference in their entirety for all purposes.

FIELD OF THE INVENTION

The illustrative embodiments relate generally to a valve for controlling fluid flow there through and, more specifically, to an improved valve having a flap that is disposed between two plates and capable of movement between an open and closed position.

BACKGROUND

Many portable electronic devices, including medical devices, require pumps for delivering a positive pressure or providing a vacuum that are relatively small in size, and it is advantageous for such pumps to be inaudible in operation so as to provide discrete operation. To achieve the desired objectives of small size, high efficiency, and inaudible operation, such pumps must operate at very high frequencies, in turn requiring valves that must operate at very high frequencies to be effective, typically of around 20 kHz and higher. One such high frequency pump, having a substantially disc-shaped cavity with a high aspect ratio, i.e., the ratio of the radius of the cavity to the height of the cavity, is disclosed in international patent publication WO 2006/111775, the entire contents of which are herein incorporated by reference.

To operate at these high frequencies, the valve must be responsive to a high frequency oscillating pressure that can be rectified to create a net flow of fluid through the pump. One such valve that is suitable for operating at frequencies of 20 kHz, and higher, is described in international patent publication WO 2010/139917, the entire contents of which are herein incorporated by reference.

Valve design may be optimised to minimise flow restriction, and to maximise valve response time and longevity. To achieve this, however, several compromises may need to be made. One such compromise relates to the valve flap thickness. A thick valve flap will have high robustness but slow valve response, and conversely a thin valve flap will have a relatively low robustness but fast valve response. Another compromise relates to valve hole size. Small valve holes are desirable for reducing valve fatigue; however, fabricating small holes by chemical etching requires a thin valve plate, which can lead to problems with valve stiffness and significant deflection or vibrations caused by the pump pressure. A further problem with etching holes is that they often result in sharp corners and rough edges, which can cause the valve flap to wear away when it impacts or contacts the valve plate at the edge of the hole, especially if a relatively thin valve flap has been chosen for fast valve response. Fabrication of smaller holes by alternative approaches, such as electroforming or laser machining, could potentially reduce the impact of the sharp edges, but such processes can be slow and expensive.

To achieve high performance and long lifetime, valves are required that can operate for 1,000s hours of continuous operation. Even with careful valve design within the above mentioned constraints, it is not uncommon for valves to fail after approximately $10^{11}$ cycles, often due to failure of the valve flap.

The present invention therefore aims to provide an improved, more robust valve that mitigates these issues.

SUMMARY OF THE PRESENT INVENTION

Described herein is a valve for controlling fluid flow, the valve comprising: a first plate comprising a plurality of first holes extending generally perpendicular through said first plate; a second plate comprising a plurality of second holes extending generally perpendicular through said second plate, the second holes being substantially offset from the first holes of said first plate; a spacer disposed between said first plate and said second plate to form a cavity therebetween in fluid communication with the first holes of said first plate and the second holes of said second plate; a flap disposed and moveable between said first plate and said second plate, said flap having holes substantially offset from the first holes of said first plate and substantially aligned with the second holes of said second plate; wherein said flap is operable to be motivated between said first and second plates in response to a change in direction of the differential pressure of the fluid across the valve; and wherein at least one of said first plate or said second plate has a coating arranged to control the distribution of one or more forces asserted on said flap when said flap impacts or is in contact with said first plate or second plate by controlling the areas of the flap over which said forces are asserted to inhibit wear of said flap at said areas.

The force asserted on the valve flap may be force asserted on the flap by the fluid in response to a change in direction of the differential pressure of the fluid across the valve. Alternatively, or additionally, the first plate or second plate may apply a force to the valve flap when it impacts thereon or contacts therewith. Thus, said force may comprise one or more forces asserted on (or applied to) the valve flap in one or more directions by one or more aspects of the valve.

By controlling the distribution of force(s) asserted on the valve flap, the present invention advantageously reduces the force(s) asserted at any one point (or position) on said valve flap, compared to the force(s) that would be asserted on the valve flap when impacting or in contact with a valve plate absent such coating.

Preferably, the coating is arranged to control the distribution of force asserted on the valve flap when said flap impacts or is in contact with said first plate or said second plate so as to reduce, minimise and/or inhibit wear or fatigue of the flap, for example whereby to prolong the lifespan of the valve flap.

The coating may be arranged to control the distribution of force asserted on said flap in the region of at least one of said first holes or said second holes.

The coating of the first and/or second plate may help reduce, minimise and/or inhibit wear and fatigue of the flap. The coating may help to reduce, or minimise and/or inhibit wear and fatigue of the flap by reducing the rate of deceleration of the flap when it contacts the first plate or second plate, which reduces the force experienced by the flap, thereby prolonging the lifespan of the flap, and hence the valve. The coating may also result in reduced flow restrictions thought the valve structure which may increase the valve performance.

The said areas of the flap over which said forces are asserted may be areas of said flap that impact or contact regions of said first or second plate adjacent said first holes or said second holes. The said regions of said first or second plate may be edges of said first holes or said second holes.

The coating may extend at least partially across an internal surface of at least one of said first plate or second plate, and preferably extends at least partially into the holes of said plate to cover at least part of an internal surface of said holes.

Additionally, the coating may extend at least partially across an internal surface of the other of said first or second plate, and preferably extends at least partially into the holes of said other plate to cover at least part of an internal surface of said holes. Preferably, the coating may extend at least partially across an external surface of at least one of the first plate or second plate.

The coating or further coating may have thickness that is equal to less than half the diameter of said first or second holes on said first or second plate on which said coating is applied. The thickness of said coating may be less than 100 µm, preferably less than 10 µm, and more preferably around 4 µm.

The coating may be arranged to provide at least one region of increased height on a surface of the first or second plate. The said at least one region being of increased height with respect to the rest of the surface of the first or second plate. Preferably, the at least one region of increased height may form at least part of an edge of a hole in said plate.

Preferably, the at least one region of increased height may be on an inner surface of the plate, and preferably wherein the surface of the plate surrounding the at least one region of increased height is recessed. The at least one region of increased height may be at least in part provided by a raised support layer disposed on the surface of the plate.

Preferably, the raised support layer may be at least partially covered by the coating, more preferably the coating layer may completely cover the raised support layer; and even more preferably wherein the coating layer extends into the holes in the plate such that is at least partially covers an internal surface of the holes.

The coating may be at least partially removed in one or more patterned regions on the internal surface and/or the external surface of at least one of the first and second plates so as to aide valve assembly.

Preferably, the one or more patterned regions may lie between the holes in the first and/or second plate such that the coating surrounds the holes.

Alternatively, or additionally, the one or more patterned regions may be arranged to form one or more raised sealing edges on the first and/or second plate.

Preferably, the one or more patterned regions may be arranged to form one or more additional structures on the first and/or second plate, for example flow channels and projections.

Preferably, the first plate and second plate may both comprise said coating, wherein the coating is provided on at least a part of the surfaces of each of the first and second plate, and preferably wherein the coating covers the entirety of each of the first and second plate.

As referred to herein, a "coating" preferably connotes at least one layer of material suitable for providing a coating when applied, for example, to the or each plate of the valve.

The coating may be formed from any suitable material including, without limitation, metal, ceramic, glass, or plastic. Preferably, the coating is formed of a material with a lower hardness than the valve flap. The flap may be formed of Polyethylene terephthalate (PET). The coating may be formed of Parylene or another soft polymeric material.

In a preferred embodiment, the valve may be suitable for operating at frequencies of 20 kHz or higher. The diameter of the plurality of first and/or second holes extending through the first and/or second plates may be less than 500 µm. Preferably, the diameter of said holes is less than 200 µm; more preferably, the diameter of said holes is less than 150 µm. In some embodiments, the plurality of first and/or second holes extending through the first and/or second plates may have a diameter in the range 130-140 µm. In other embodiments said holes may have a diameter of 100 µm.

The valve flap may have a thickness of less than 45 µm. Preferably, the valve flap has a thickness of less than 10 µm; more preferably, the valve flap has a thickness of less than 5 µm. In some embodiments the valve flap may have a thickness in the range 2-3 µm. In other embodiments, the valve flap may have a thickness of 1.4 µm. Preferably, the mass per unit area of the valve flap is less than 60 g/m$^2$.

The coating may have any suitable thickness. Preferably the coating may have a thickness less than the radius of the holes in the valve to prevent the holes becoming blocked. More preferably the coating thickness should be optimised to reduce the narrowing of the holes whist providing adequate protection to the valve flap in use and minimising the impact on the production processes.

In some embodiments the valve flap may have a thickness of <10 um. In other embodiments the valve flap may have a thickness in the range 2-6 um.

According to another aspect, there is provided a pump comprising at least one valve as described herein.

Preferably, the pump comprises a first base and a second base connected by at least one side wall to define an internal pump cavity. For example, the first and second bases may be generally circular and the at least one side wall may be generally cylindrical.

Preferably, an actuator is disposed between the first base and second base. The actuator may be arranged to separate said internal pump cavity into two separate pump cavities such that fluid cannot pass between the two cavities via the actuator. The two pump cavities may therefore comprise a first cavity defined between the first base and the actuator, and a second cavity defined between the second base and the actuator.

Preferably, the pump comprises at least one aperture provided in each of the first base and the second base, in which is provided a valve as described herein, such that each of said at least one aperture may be described as a "valved aperture". Preferably, each valve is configured to allow fluid to flow in only one direction, and can therefore be described as a "one-way" valve.

One or more valved apertures provided in the first base may be connected (e.g. in fluid communication) with one or more valved apertures provided in the second base, for example via a manifold, preferably a pneumatic manifold.

The pump may further comprise at least one further aperture, provided in at least one of the first base or second base, which aperture does not have a valve. As such, each of said at least one further aperture may be described as an "unvalved aperture". Preferably, the pump comprises at least one unvalved aperture provided in each of the first base and the second base. Additionally, or alternatively, one or more unvalved apertures provided in the first base may be connected (e.g. in fluid communication) with one or more unvalved apertures provided in the second base, for example via a manifold, preferably a pneumatic manifold.

In one example, a pump as described above may comprise a first valved aperture provided in the first base, and a second valved aperture provided in a second base, wherein each of the first valve aperture and second valved aperture is configured (only) to allow fluid to exit the first cavity and the second cavity, respectively. The pump may therefore further comprise at least one unvalved aperture in each of the first base and second base to allow fluid to enter the first cavity and second cavity, respectively. Preferably, the first base and the second base each comprise a plurality of unvalved apertures, preferably wherein the first and second valved apertures are located generally centrally in the first base and second base, respectively, such that the unvalved apertures are distributed around the valved apertures.

In another example, the pump may comprise a first valved aperture provided in the first base, and a second valved aperture provided in the second base. Furthermore, each of the first base and second base may comprise at least one unvalved aperture, and preferably a plurality of unvalved apertures, preferably located around the centrally located first and second valved apertures in each of said first base and second base, respectively. The first valved aperture may be configured (only) to allow fluid to enter the first cavity, and the second valved aperture may be configured (only) to allow fluid to exit the second cavity (or vice versa), with the first cavity and second cavity fluidly being connected via the unvalved apertures provided in the first base and second base, for example via a manifold arrangement, to allow fluid to flow between the first cavity and second cavity.

In another example, the pump may comprise a first valved aperture provided in the first base, and a second valved aperture provided in the second base, wherein each of the first and second valved apertures are configured (only) to allow fluid to enter the first and second cavity, respectively. The first and second valved apertures may be configured to receive a supply of fluid from a common source, for example via a manifold arrangement. Furthermore, each of the first base and second base may comprise at least one unvalved aperture, and preferably a plurality of unvalved apertures, preferably located around the centrally located first and second valved apertures in each of said first base and second base, respectively, for fluid to exit the first and second cavities. Another manifold arrangement may be provided for the unvalved apertures.

In a further example, the pump may comprise two valved apertures in each of the first and second base, each of said two valved apertures comprising a valved aperture configured (only) to allow fluid to enter the respective first or second cavity, and a valved aperture configured (only) to allow fluid to exit the respective first or second cavity. The first cavity and second cavity may be fluidly connected via the valved aperture configured (only) to allow fluid to exit the first cavity and the valved aperture configured (only) to allow fluid to enter the second cavity, such that fluid from the first cavity can flow to the second cavity, for example via a manifold arrangement. In this example, there may be no unvalved apertures provided in either the first base or second base.

In a further example, the pump may comprise two valved apertures in each of the first and second base, each of said two valved apertures comprising a valved aperture configured (only) to allow fluid to enter the respective first or second cavity, and a valved aperture configured (only) to allow fluid to exit the respective first or second cavity. The two valved apertures configured (only) to allow fluid to enter the respective first or second cavity may be arranged to receive a supply of fluid from a common source, for example via a manifold arrangement. The other two valved apertures configured (only) to allow fluid to exit the respective first cavity or second cavity may be fluidly connected to a manifold arrangement.

In a further example, the pump may comprise two valved apertures in each of the first and second base, each of said two valved apertures comprising a valved aperture configured (only) to allow fluid to enter the respective first or second cavity, and a valved aperture configured (only) to allow fluid to exit the respective first or second cavity, as described above. Furthermore, each of the first base and second base may comprise at least one unvalved aperture, and preferably a plurality of unvalved apertures, preferably located around the centrally located first and second valved apertures in each of said first base and second base, respectively. The first and second unvalved apertures allow fluid freely to enter and exit the respective first and second cavities.

In a further example, the pump may comprise two valved apertures in the first base, said two valved apertures comprising a valved aperture configured (only) to allow fluid to enter the first cavity, and a valved aperture configured (only) to allow fluid to exit the first cavity. The pump may further comprise a single valved aperture in the second base, configured (only) to allow fluid to exit the second cavity. A further, unvalved, aperture may be provided in the second base to allow fluid freely to enter and exit the second cavity. The two valved apertures configured (only) to allow fluid to exit the respective first cavity or second cavity may be fluidly connected to a manifold arrangement.

According to another aspect, there is provided a method for providing (e.g. manufacturing, fabricating or assembling) a valve as described herein, the method comprising the step of: prior to assembling the components of the valve (e.g. to construct the valve), applying a coating onto a surface of at least one of said first plate or second plate such that the coating extends at least partially across the surface of said plate, preferably wherein the surface is arranged to form an internal surface of the pump, and more preferably wherein said coating extends at least partially into one or more holes of said plate.

Preferably, a layer of coating material is applied at least in part onto a surface of each of the first plate and second plate.

The coating or further coating may be applied to have a thickness that is equal to less than half the diameter of said first or second holes on said first or second plate on which said coating is applied. The thickness of said coating may be less than 100 µm, preferably less than 10 µm, and more preferably around 4 µm.

The coating may be arranged to provide at least one region of increased height on a surface of the first or second plate. The said at least one region being of increased height with respect to the rest of the surface of the first or second plate. The at least one region of increased height may form at least part of an edge of a hole in said plate.

Preferably, the at least one region of increased height may be on an inner surface of the plate, and preferably wherein the surface of the plate surrounding the at least one region of increased height is recessed. The at least one region of increased height may be at least in part provided by a raised support layer disposed on the surface of the plate.

Preferably, the raised support layer may be at least partially covered by the coating, more preferably the coating layer may completely cover the raised support layer; and even more preferably wherein the coating layer extends into the holes in the plate such that is at least partially covers an internal surface of the holes.

The coating may be applied to or removed from a plate by any suitable process. For example, the coating may be applied by vacuum deposition with selective areas masked. In another example, the coating may be applied by vacuum deposition and subsequently selectively removed by laser machining.

Thus, a mask may be selectively applied onto at least a portion of a surface of at least one of said first or second plate to form a patterned region, and the coating then applied over said plate and masked surface, such that the mask prevents the coating from being applied to the masked portion of the surface.

The coating may be at least partially removed in one or more patterned regions on the internal surface and/or the external surface of at least one of the first and second plates so as to aide valve assembly.

Preferably, the one or more patterned regions may lie between the holes in the first and/or second plate such that the coating surrounds the holes.

Alternatively, or additionally, the one or more patterned regions may be arranged to form one or more raised sealing edges on the first and/or second plate.

Preferably, the one or more patterned regions may be arranged to form one or more additional structures on the first and/or second plate, for example flow channels and projections.

It will be understood that any apparatus feature described herein may be provided as a method feature, and vice versa. Furthermore, any feature in a particular aspect or embodiment described herein may be applied to another aspect, in any appropriate combination. It should also be appreciated that particular combinations of the various features described and defined in any aspects described herein can be implemented and/or supplied and/or used independently.

BRIEF DESCRIPTION OF THE DRAWINGS

Aspects and embodiments of the present invention will now be described, by way of example only, with reference to the accompanying drawings, in which:

FIGS. 4A to 4C show schematic cross-section views of a valve in a neutral open position, a closed position and an open position, respectively;

FIG. 5 shows a schematic cross-section view of a valve in a closed position;

FIG. 6 shows a schematic cross-section view of a valve with misaligned plates in an open position;

FIGS. 8A and 8B show schematic cross-sectional views of two different embodiments of a valve having a coating according to two different embodiments;

FIGS. 9A-9C show two further embodiments of a valve having a coating arranged to provide raised sealing edges around holes of the valve;

FIGS. 10A-10C show two further embodiments of a valve having raised sealing edges and additional release structures;

FIGS. 11A and 11B show a valve having a support layer and a coating;

FIG. 12 shows another embodiment of a coated valve;

FIG. 13 shows a further embodiment of a coated valve;

SPECIFIC DESCRIPTION

Figure 1:
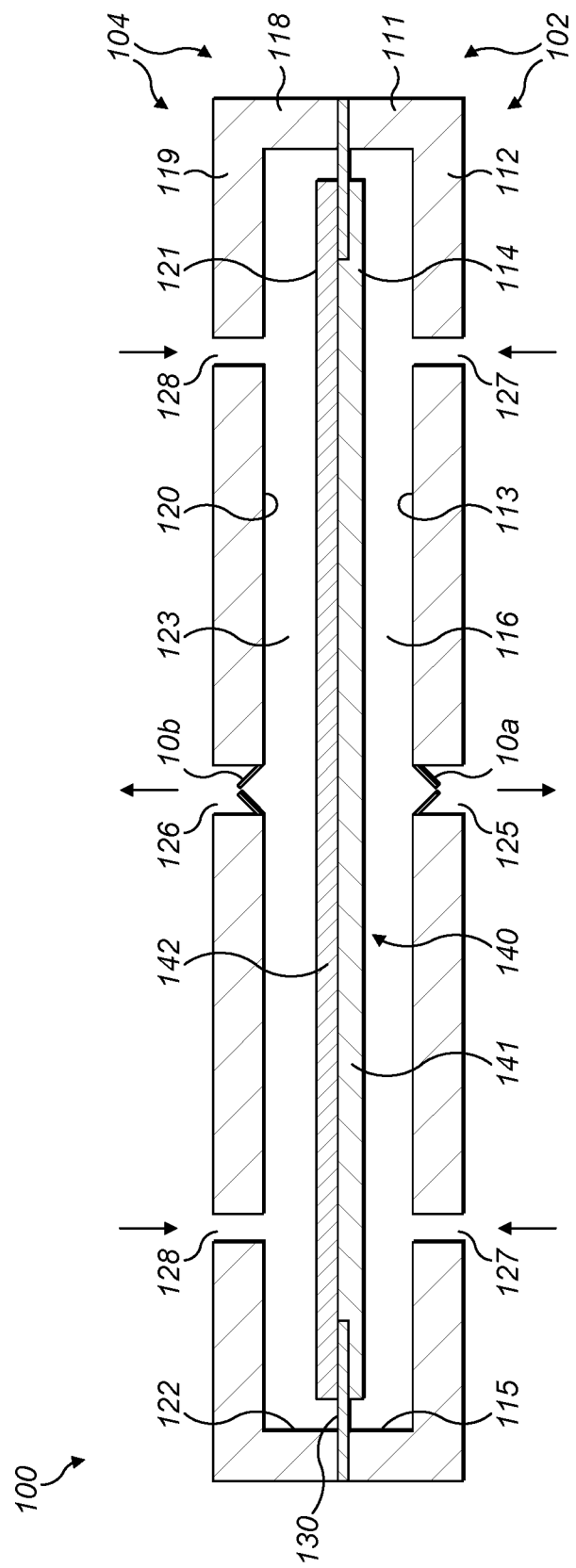
FIG. 1 shows a schematic cross-section of a two-cavity pump.

In the following description and accompanying drawings, corresponding features of different embodiments are, preferably, identified using corresponding reference numerals.

To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

FIG. 1 is a schematic cross-section of a pump 100 having two separate cavities 116, 123. The pump 100 comprises a first pump body 102 having a substantially cylindrical shape including a cylindrical wall 111 closed at one end by a (first) base 112 and closed at the other end by an end plate 141 and a ring-shaped isolator 130 disposed between the end plate 141 and the other end of the cylindrical wall 111 of the first pump body. The cylindrical wall 111 and base 112 may be a single component comprising the first pump body 102.

Pump 100 also comprises a second pump body 104 having a substantially cylindrical shape including a cylindrical wall 118 closed at one end by a (second) base 119 and closed at the other end by a piezoelectric disc 142 and the ring-shaped isolator 130 disposed between the end plate 142 and the other end of the cylindrical wall 118 of the second pump body. The cylindrical wall 118 and base 119 may be a single component comprising the second pump body 104.

The first pump body 102 and the second pump body 104 may be mounted to other components or systems.

The internal surfaces of the cylindrical wall 111, the base 112, the end plate 141, and the isolator 130 form a first cavity 116 within the pump 100 wherein said first cavity 116 comprises a side wall 115 closed at both ends by end walls 113, 114. The end wall 113 is the internal surface of the base 112 and the side wall 115 is the inside surface of the cylindrical wall 111. The end wall 114 comprises a central portion corresponding to a surface of the end plate 141 and a peripheral portion corresponding to a first surface of the isolator 130. Although here the first cavity 116 is substantially circular in shape, the first cavity 116 may also be elliptical or other suitable shape.

The internal surfaces of the cylindrical wall 118, the base 119, the piezoelectric disc 142, and the isolator 130 form a second cavity 123 within the pump 100 wherein said second cavity 123 comprises a side wall 122 closed at both ends by end walls 120, 121. The end wall 120 is the internal surface of the base 119 and the side wall 122 is the inside surface of the cylindrical wall 118. The end wall 121 comprises a central portion corresponding to the inside surface of the piezoelectric disc 142 and a peripheral portion corresponding to a second surface of the isolator 130. Although the second cavity 123 is substantially circular in shape, the second cavity 123 may also be elliptical or other suitable shape. The cylindrical walls 111, 118 and the bases 112, 119 of the first and second pump bodies may be formed from any suitable rigid material including, without limitation, metal, ceramic, glass, or plastic.

The piezoelectric disc 142 is operatively connected to the end plate 141 to form an actuator 140 that is operatively associated with the central portion of the end walls 114, 121 via the end plate 141 and the piezoelectric disc 142. The piezoelectric disc 142 is not required to be formed of a piezoelectric material, but may be formed of any electrically active material such as, for example, an electrostrictive or magnetostrictive material. As such, the term "piezoelectric disc" is intended to cover electrostrictive or magnetostrictive discs as well. The end plate 141 preferably possesses a bending stiffness similar to the piezoelectric disc 142 and may be formed of an electrically inactive material such as a metal or ceramic. When the piezoelectric disc 142 is excited by an oscillating electrical current, the piezoelectric disc 142 attempts to expand and contract in a radial direction relative to the longitudinal axis of the cavities 116, 123 causing the actuator 140 to bend, thereby inducing an axial deflection of the end walls 114, 121 in a direction substantially perpendicular to the end walls 114, 121. The end plate 141 alternatively may also be formed from an electrically active material such as, for example, a piezoelectric, magnetostrictive, or electrostrictive material. In another embodiment, the actuator 140 may be replaced by a single plate in force-transmitting relation with an actuation device, for example, a mechanical, magnetic or electrostatic device, wherein said plate forms the end walls 114, 121 and said plate may be formed as an electrically inactive or passive layer of material driven into oscillation by such device (not shown) in the same manner as described above.

In use, the axial deflection of the end walls 114, 121 generate substantially proportional "pressure oscillations" of fluid within the cylindrical cavities 116, 123, creating a radial pressure distribution approximating that of a Bessel function of the first kind as described in WO 2006/111775 and WO 2010/139917.

The pump 100 further comprises at least two apertures extending from the first cavity 116 to the outside of the pump 100, wherein at least one of the apertures may contain a valve to control the flow of fluid through the aperture. Although the aperture containing a valve may be located at any position in the cavity 116 where the actuator 140 generates a pressure oscillation as described below in more detail, one preferred embodiment of the pump 100 comprises an aperture with a valve located at approximately the centre of the end wall 113. The pump 100 shown in FIG. 1 comprises a primary aperture 125 extending from the cavity 116 through the base 112 of the pump body at about the centre of the end wall 113 and containing a valve 10a. The valve 10a is mounted within the primary aperture 125 and permits the flow of fluid in one direction as indicated by the arrow so that it functions as an outlet for the pump 100. The open aperture 127 may be located at any position within the cavity 111 other than the location of the aperture 125 with the valve 10a. In one preferred embodiment of the pump 100, the open aperture is disposed offset from the centre of the end wall 113. The embodiment of the pump 100 shown in FIG. 1 comprises two secondary apertures 127 extending from the cavity 116 through the base 112 that are disposed offset from the centre of the end wall 113.

The pump 100 further comprises at least two apertures extending from the second cavity 123 to the outside of the pump 100, wherein at least a first one of the apertures may contain a valve to control the flow of fluid through the aperture. Although the aperture containing a valve may be located at any position in the cavity 123 where the actuator 140 generates a pressure oscillation as described below in more detail, one preferred embodiment of the pump 100 comprises an aperture with a valve located at approximately the centre of the end wall 120. The pump 100 shown in FIG. 1 comprises a primary aperture 126 extending from the cavity 123 through the base 119 of the pump body at about the centre of the end wall 120 and containing a valve 10b. The valve 10b is mounted within the primary aperture 126 and permits the flow of fluid in one direction as indicated by the arrow so that it functions as an outlet for the pump 100. The open aperture 128 may be located at any position within the cavity 123 other than the location of the aperture 126 with the valve 10b. In one preferred embodiment of the pump 100, the open aperture is disposed offset from the centre of the end wall 120. The embodiment of the pump 100 shown in FIG. 1 comprises two secondary apertures 128 extending from the cavity 123 through the base 119 that are disposed offset from the centre of the end wall 120.

Although the secondary apertures 127, 128 are not valved in this embodiment of the pump 100, they may also be valved to improve performance if necessary. In this embodiment of the pump 100, the primary apertures 125, 126 are valved so that the fluid is drawn into the cavities 116, 123 of the pump 100 through the secondary apertures 127, 128 and pumped out of the cavities 116, 123 through the primary aperture 125, 126 as indicated by the arrows.

The valves 10a, 10b allow fluid to flow through in substantially one direction as described above. The valves 10a, 10b may be a ball valve, a diaphragm valve, a swing valve, a duck-bill valve, a clapper valve, a lift valve, or any other type of check valve or any other valve that allows fluid to flow substantially in only one direction. Some valve types may regulate fluid flow by switching between an open and closed position. For such valves to operate at the high frequencies (e.g. 20 KHz, and higher) generated by the actuator 140, the valves 10a, 10b must have an extremely fast response time such that they are able to open and close on a timescale significantly shorter than the timescale of the pressure variation. One embodiment of the valves 10a, 10b achieves this by employing an extremely light flap valve which has low inertia and consequently is able to move rapidly in response to changes in relative pressure across the valve structure.

Figure 2A:
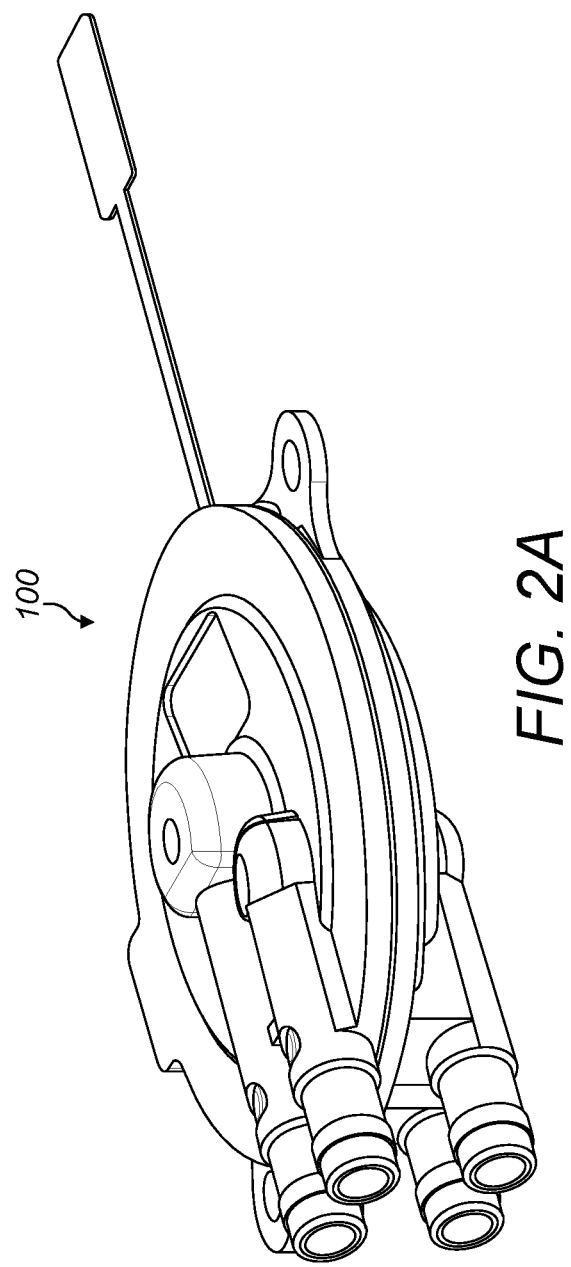
FIGS. 2A and 2B show an embodiment of the two-cavity pump of FIG. 1.
Figure 2B:
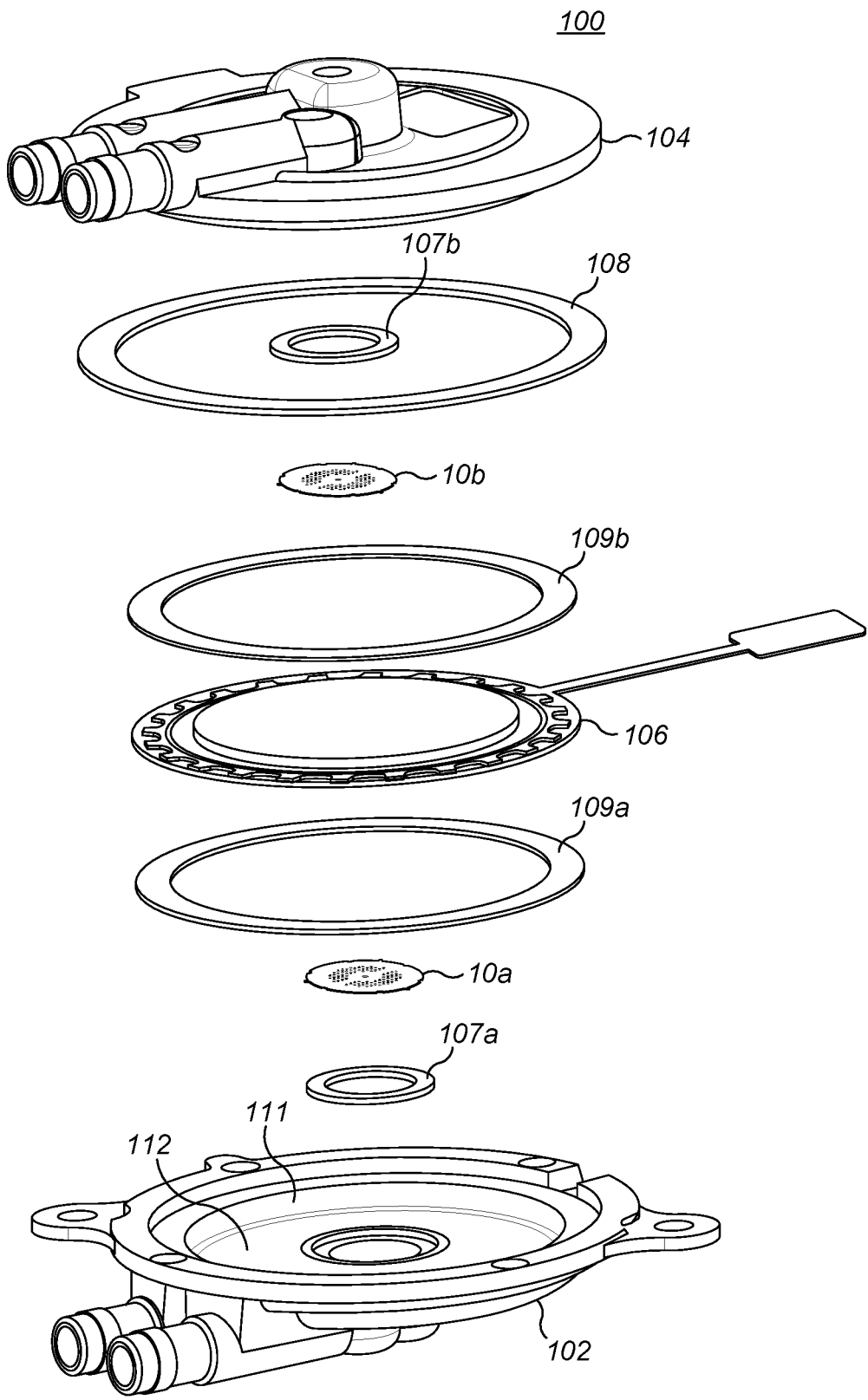

FIGS. 2A and 2B show an exemplary embodiment of the schematic pump 210 described in FIG. 1. FIG. 2A shows the pump 100 assembled, while FIG. 2B shows an exploded view of the pump 100. The pump 100 comprises a first (or "lower") pump body 102 and a second (or "upper") pump body 104. The first pump body 102 incorporates the cylindrical wall 111, base 112, unvalved aperture 128 and the valved aperture 126. Similarly, the second pump body 104 incorporates the cylindrical wall 118, base 129, unvalved aperture 127 and the valved aperture 125. The pump bodies 102, 104 may be formed from any suitable rigid material including, but not limited to, metal, ceramic, glass or plastic. The pump bodies 102, 104 may also be made by any suitable process including moulding, machining, casting, additive manufacturing or laminate assembling. In one particular embodiment they may be formed of moulded polyarylamide, such as IXEF™.

The pump 100 further comprises an actuator assembly 106, comprising the actuator 140 and the isolator 130, and may include features such as roughened surfaces or apertures to allow adhesive to key into the isolator 130 in order to improve the bonding of the isolator to the pump bodies 102, 104. The actuator assembly 106 may be located between the first bump body 102 and the second pump body 104 in order to create a first cavity 116 and a second cavity 123 between the actuator assembly 106 and the first and second pump bodies 102, 104 respectively.

Two valve bonding features 107a, 107b form a bond and pneumatic seal between the first valve 10a and the first pump body 102 and the second valve 10b and second pump body 104 respectively. A further pump body bonding feature 108 forms a bond and pneumatic seal between the first pump body 102 and second pump body 104. The bonding features 107a, 107b, 108 may be, for example, an adhesive or a UV curing adhesive or may be replaced by alternative materials or processes including pressure sensitive adhesive, welding, ultrasonic welding, heat sealing or soldering.

The pump 100 also comprises two isolator clamping features 109a, 109b which trap the isolator 130, of the actuator assembly 106, between the first pump body 102 and the second pump body 104. In addition to the materials and processes used in relation to the valve bonding features 107a, 107b, 108 the isolator clamping features 109a, 109b may also provide compression instead of a physical bond by using, for example, compressible materials such as foam or silicone.

In the exemplary "two-cavity" pump 100 described above, the two cavities 116, 123 may be considered as separate pumping units, albeit driven by the same actuator and therefore not independently controllable. These two pumping units may be connected in series or parallel in order to deliver increased pressure or increased flow respectively through the use of an appropriate manifold (as shown later). Such manifold may be separate components or be incorporated into the pump body components 102 and 104 to facilitate assembly and to reduce the number of parts required in order to assemble the pump 100.

In the illustrative example of a pump 100 in FIG. 2, four external pneumatic connections are provided to the pump 100, which connect to the valved apertures 125, 126 and unvalved apertures 127, 128. This allows different pump configurations to be achieved by connecting various external manifolds and configuring the valves to control flow in certain directions, as will be described in more detail further on.

The term "reduced pressure" as used herein generally refers to a pressure less than the ambient pressure where the pump 100 is located. Although the term "vacuum" and "negative pressure" may be used to describe the reduced pressure, the actual pressure reduction may be significantly less than the pressure reduction normally associated with a complete vacuum. The pressure is "negative" in the sense that it is a gauge pressure, i.e., the pressure is reduced below ambient atmospheric pressure. Unless otherwise indicated, values of pressure stated herein are gauge pressures. References to increases in reduced pressure typically refer to a decrease in absolute pressure, while decreases in reduced pressure typically refer to an increase in absolute pressure.

Figure 3A:
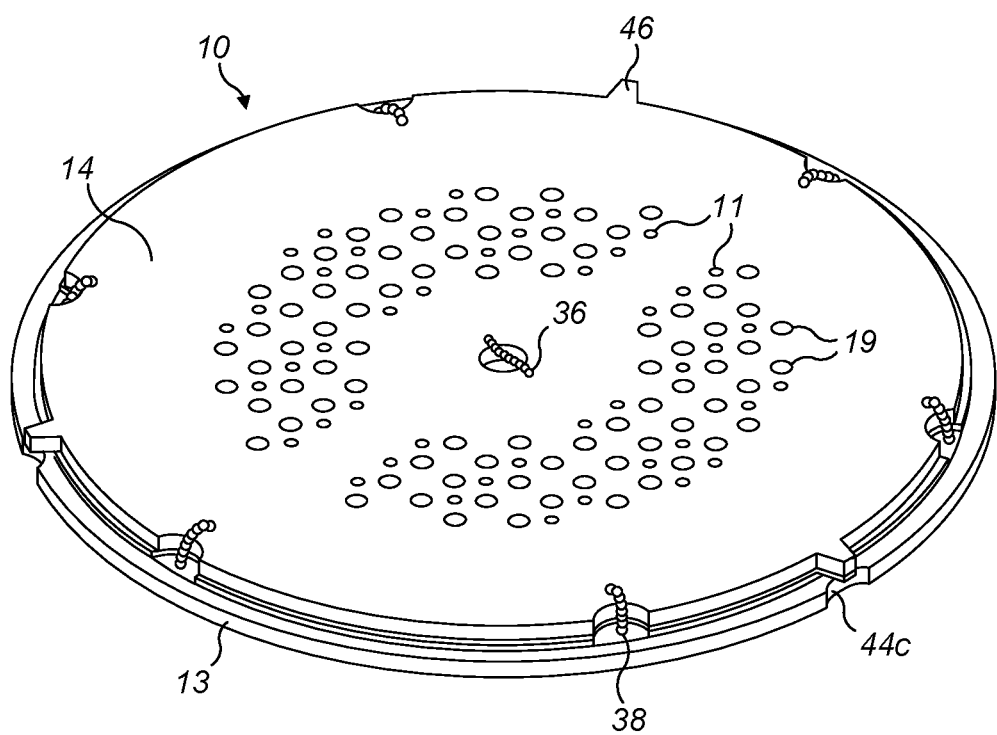
FIGS. 3A and 3B show a valve for the pump in FIG. 2.

A valve 10, such as one generally taught in WO 2010/139917, is shown in FIG. 3A. The valve 10 comprises a substantially cylindrical wall 13 that is ring-shaped (e.g. annular) closed at one end by a first plate 16 (e.g. a "sealing" plate) and at the other end by a second plate 14 (e.g. a "retention" or "open" plate) such that the sealing plate 16 and open plate 14 are spaced apart by the ring-shaped wall 13. The inner surfaces of the ring-shaped wall 13 and the two plates 14, 16 form a valve cavity 12 within the valve 10 in which is disposed a substantially circular (valve) flap 18, which is movable between the two plates 14, 16.

Figure 3B:
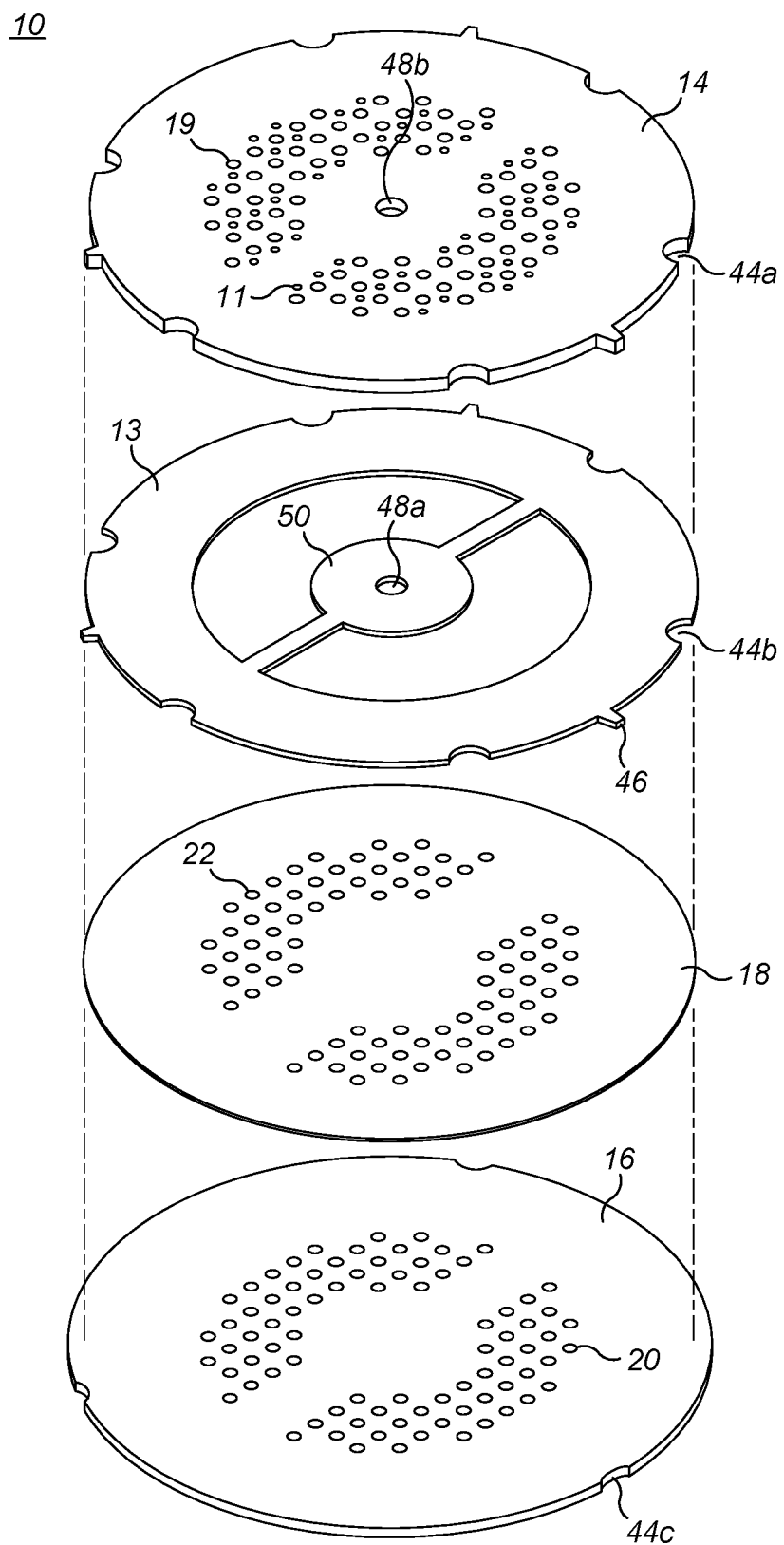

FIG. 3B shows an exploded view of the valve 10, in which the flap 18 is located adjacent the sealing plate 16, though the flap 18 may alternatively be disposed adjacent the open plate 14 in an alternative embodiment, and in this sense the flap 18 is considered to be "biased" against either one of the sealing plate 16 or open plate 14.

The peripheral portion of the flap 18 is sandwiched between the sealing plate 16 and the ring-shaped wall 13 so that the motion of the flap 18 is restrained in the plane substantially perpendicular the surface of the flap 18. The motion of the flap 18 in such plane may also be restrained by the peripheral portion of the flap 18 being attached directly to either the sealing plate 16 or the ring-shaped wall 13, or by the flap 18 being a close fit within the ring-shaped wall 13, in alternative embodiments. The remainder of the flap 18 is sufficiently flexible and movable in a direction substantially perpendicular the surface of the flap 18, so that a force applied to either surface of the flap 18 will motivate the flap 18 between the sealing plate 16 and the open plate 14.

Each of the open plate 14 and sealing plate 16 has a plurality of holes 19, 20 respectively, which extend through each plate 14, 16. The holes 19, 20 in the respective plates 14, 16 are offset from each other such that none of the holes 19 of the open plate 14 align with the holes 20 of the sealing plate 16. The flap 18 also has a plurality of holes (or "apertures") 22, which are generally aligned with the holes 19 of the open plate 14 to provide a passage through which fluid, including a gas or liquid, may flow.

Although the holes 19, 20, 22 are shown to be of substantially uniform size and shape, they may be of different diameters or even different shapes. The pattern of holes 19, 20, 22 may be designed to increase or decrease the number of holes to control the total flow of fluid through the valve 310 as required. For example, the number of holes 19, 20, 22 may be increased to reduce the flow resistance of the valve 10.

The open plate 14 may also include additional release holes 11. The presence of these release holes 11 helps to enable the valve flap 18 to accelerate away from the valve open plate 14 quickly when the differential pressure across the valve changes sign appropriately, thereby helping to minimise the response time of the valve.

In use, the flap 18 is motivated between the plates 14, 16 in response to a change in direction of the differential pressure of fluid across the valve 10, which thereby effectively controls the flow of fluid through the valve 10, and provides rectification of the alternative pressure wave created in the pump cavity.

The four components of the valve 10 may be fixed or connected together by any suitable method including gluing, soldering, electrical spot-welding or seam-welding, or laser spot-welding or seam-welding. A complicating factor is the presence of the valve flap 18 which may be a thin polymer layer as described above that can hinder many of these methods. In particular, the polymer layer acts as an electrical and thermal insulating layer which can hinder any one of these bonding methods. A preferred method for connecting the components of the valve 10 is laser spot-welding, as it forms an extremely strong and durable bond, and further enables accurate control of the gap between the sealing plate 16 and open plate 14. A factor in the quality of such a laser welding process is the degree of contact between the components being welded. In order to achieve a good weld, the parts should be suitably clamped to ensure good contact and therefore good heat transfer between layers.

As indicated above, the presence of the flap 18 may act as a thermal barrier. This can prevent effective transfer of heat from the metal open plate 114 and cylindrical walls 13 on one the side of the flap 18 to the metal sealing plate 16 on the opposite side of the flap 18. This results in an increased level of laser power or pulse energy that is required in order to achieve a strong weld, risking the possibility of accidentally drilling through all the components of the valve 10, the significant ejection of material from the weld site, the possibility of significant heat damage to the polymer flap 18, and thermal distortion of the components resulting from the welding process. If the laser power is too low, then a melt is generated only in the open plate 14 and the cylindrical walls 13 failing to form a complete bond with the sealing plate 16. Any of these effects can dramatically reduce the performance of the valve 10.

Referring still to FIGS. 3A and 3B, notches 44a, 44b, 44c may be formed in the periphery of the open plate 14 and the cylindrical walls 13, respectively, so that the laser can heat the components from the bottom up starting with the formation of a melt pool first in the sealing plate 16 (burning through the plastic flap 18) without the need for melting through the open plate 14 and the cylindrical walls 13. Once the melt pool has been established on the sealing plate 16, the laser beam may be dragged sideways toward the center of the valve 10 structure thereby extending the melt pool into the cylindrical walls 13 and the open plate 14 forming a weld 38 with a number of laser pulses as illustrated by the beads forming the weld 38, thus fixing all the components together when the weld 38 cools. This process of "drag welding" dramatically reduces the laser power required for the initial melting of the sealing plate 16 as heat is transmitted directly to the sealing plate 16 by radiation (i.e., the laser beam) rather than by conduction through the open plate 14 and the cylindrical walls 13. Drag welding minimizes the production of any ejected material from the weld site, and significantly mitigates any damage to the components resulting from the heat created by the welding process. The drag welding process may be further improved by using a blanket of inert gas such as, for example, argon or nitrogen, to further reduce or eliminate ejected material from the weld site.

Another feature of the valve 10 is the center shim 50 which includes an opening or hole 48a positioned generally at the center of the valve 10. The open plate 14 comprises a similar hole (or opening) 48b that is substantially concentric with the hole 48a when the open plate 114 is positioned on top of the cylindrical walls 18. The holes 19, 20 and 22 of the open plate 14, the sealing plate 16, and the valve flap 18, respectively, are arranged on either side of the center shim 50. The center shim 50 provides additional support between the open plate 14 and the sealing plate 16, and the holes 48a, 48b provide an opening for a center drag weld 36 to be formed at the center of the valve 10 to further reinforce the open plate 14 and the sealing plate 16. The center weld 36 may be formed in the same fashion as the peripheral welds 38.

An additional feature of the valve 10 is the "singulation tabs" 46 where the valve assembly has been removed from the leadframes used to support the individual open plate 14, sealing plate 16 and cylindrical wall 13 during assembly. These singulation tabs may be removed by applying an electrical potential difference between the valve and leadframe such that a high current passes through the high electrical resistance singulation tabs, resulting in them "fusing" out. Alternative methods for separating the valve from the leadframe include, but are not limited to cutting, shearing, drilling and laser machining.

The open plate 14 and sealing plate 16 may be fabricated by a wide range of methods including but not limited to etching, machining, moulding, electroforming or laser drilling.

A close-up cross-section of an exemplary valve 10 is shown in FIG. 4A, to illustrate a problem with existing valves. As described above, both the open plate 14 and the sealing plate 16 have a number of holes (or "apertures") 19, 20, which extend through each plate 14, 16. The flap 18 is shown in a neutral position between the two plates 14, 16 with the flap 18 having a first ("upper"), surface 17 and a second ("lower") surface 15. The first and second surfaces 17, 15 are opposed, on either side of the flap, each facing towards a respective plate 14, 16. The terms "upper" and "lower" are not to be considered to be limiting to the orientation of the valve 10 and its components, but are merely being used to aid understanding of the configuration.

At least one release hole 11 is also provided in the open plate 14 to help the valve flap 18 release from the open plate 14 when fluid pressure is asserted on the top surface 17 of the valve flap 18 (i.e. to help the flap 18 move from the open position to the closed position). The release hole 11 ensures that at least a portion of the valve flap 18 is exposed to the fluid pressure so that the flap 18 can be motivated between the open and closed positions. Without the release hole 11, there is a chance that no part of the valve flap 18 would be exposed to the fluid pressure because, in general, the holes 22 in the valve flap 18 are configured to align with the holes 19 in the open plate 14. That is, the release hole 11 ensures that there is at least one hole in the open plate 14 which is not aligned with a valve flap hole 22.

When a force, such as that caused by pressure differential across the valve 10, is asserted on the first surface 17 of the flap 18, the flap 18 is motivated towards the sealing plate 16. The valve 10 is then in a "closed" position because the flap 18 is held against the sealing plate 16 as a result of the force being asserted on it with the holes 22 of the flap 18 not aligned with the holes 20 of the sealing plate 16. In this "closed" position, the flow of fluid through the sealing plate 16 is substantially blocked or covered by the main body (i.e. the non-perforated portions) of the flap 18, as shown in FIG. 4B.

Figure 4C:
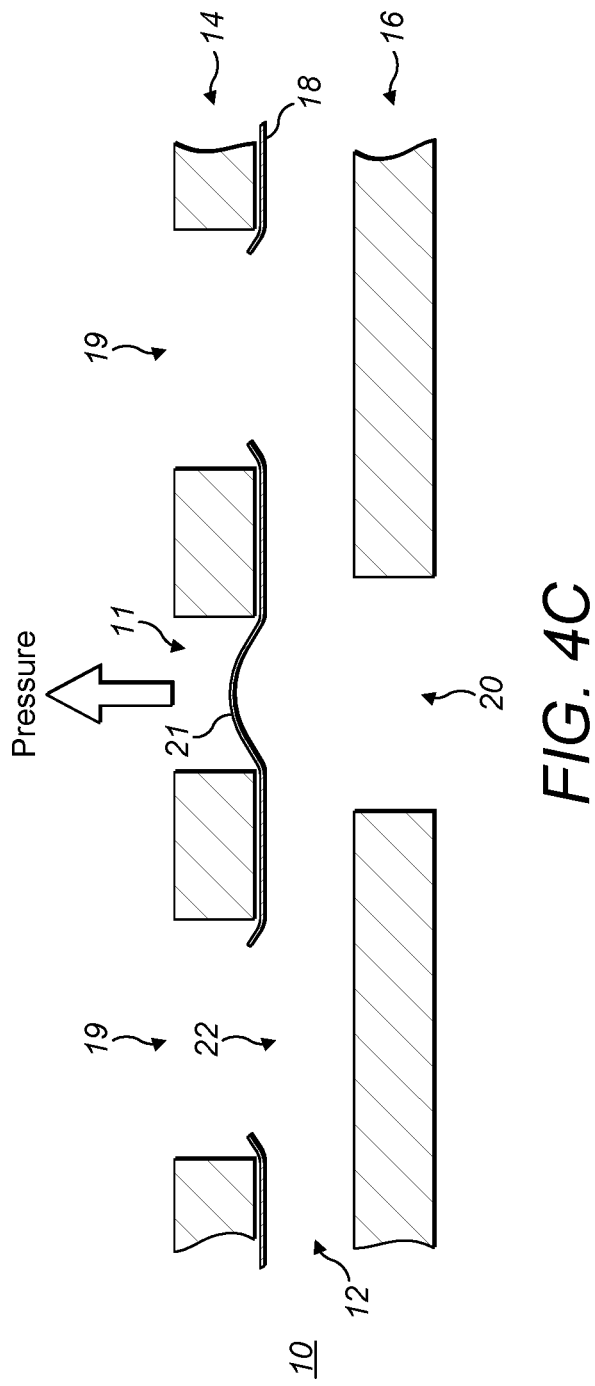

When a force is asserted against the second surface 15 of the flap 18, the flap 18 is motivated away from the sealing plate 16 towards the open plate 14, as shown in FIG. 4C. The valve 10 is now in an "open" position allowing fluid to flow through it via a fluid pathway formed between the sealing plate 16, the cavity 12, and the open plate 14. The valve flap 18 may further be biased towards either the open plate 14 or sealing plate 16.

Due to the flexible nature of the flap 18, when it is forced against either the open plate 14 or the sealing plate 16, span portions 21 of the flap 18 that are arranged to cover one or more holes 19, 20 in the plates 14, 16 will flex or distort under the pressure differential in the direction of the asserted force. For example, a span portion 21 of the flap 18, which covers the release hole 11 in the open plate 14 and one of the holes 20 in the sealing plate 16, when the flap is motivated between the two plates 14, 16, respectively, will flex into each of those holes 11, 20 when the flap 18 impacts or is in contact with the respective plate 14, 16, as shown in FIGS. 6B and 6C.

As also shown in FIGS. 5 and 6, when impacting or in contact with a plate 14, 16, the unsupported span portion 21 of the valve flap 18 becomes distorted under the pressure differential and deforms (e.g. is forced) partially into the release hole 11 of the open plate 14 and a hole 20 of the sealing plate 16, depending on whether the pressure differential is causing the valve 10 to be opened or closed.

When in the closed position, as shown in FIG. 5, there is a high wear point 24 on the valve flap 18 at the edge of the hole 20 in the sealing plate 16. At this point 24 (or "impact region"), significant physical abrasion on the flap 18 can occur due to the impact of the flap 18 with the sharp, etched hole edge at high frequencies. The effect of the fluid pressure on the flap 18 may also cause the flap 18 to be dragged across the sharp hole edge and partially into the hole 20 as it is forced against the sealing plate 16. Cyclic fatigue as the flap 18 is repeatedly deformed over the edges of the holes 20 in the sealing plate 16 also causes increased level of wear.

In FIG. 6, there is misalignment between the open plate 14 and the sealing plate 16. When the valve 10 is in the open position, as shown, there are wear points 26 on the other side of the valve flap 18 at the edge of the open plate 14 where the valve flap 18 is unsupported. Misalignment between the open plate 14 and the sealing plate 16, as a result of assembly tolerances for example, may also give rise to increased wear of the valve flap 18 in the region 31 of the valve flap 18 close to the valve flap hole 22 where portions of the flap 18 are unsupported by the open plate 14. Misalignment between the open plate 14 and the sealing plate 16 also results in high wear points arising where the sealing hole edges 23 and the edges 25 of the release hole 11 may coincide, as illustrated by a dotted line 27, which will cause both sides 15, 17 of the valve flap 18 to be worn away on at the same point i.e. at the coinciding wear points 26 on the valve flap 18.

To inhibit, reduce or otherwise minimise valve failure caused by failure of the valve flap 18 through wear or fatigue, as described above, the flap 18 may be protected from the sharp edges 20a, 19a of the holes 20, 19 in the etched plates 16, 14 by providing a coating on at least one of the sealing plate 16 and open plate 14 in the region of the sharp edges 20a, 19a. The coating is arranged to control the distribution of one or more forces asserted on the flap 18 when the flap 18 impacts or is in contact with the open plate 14 or sealing plate 16 by controlling the areas of the flap 18 over which said forces are asserted to inhibit wear of said flap 18 at said areas.

Figure 7A:
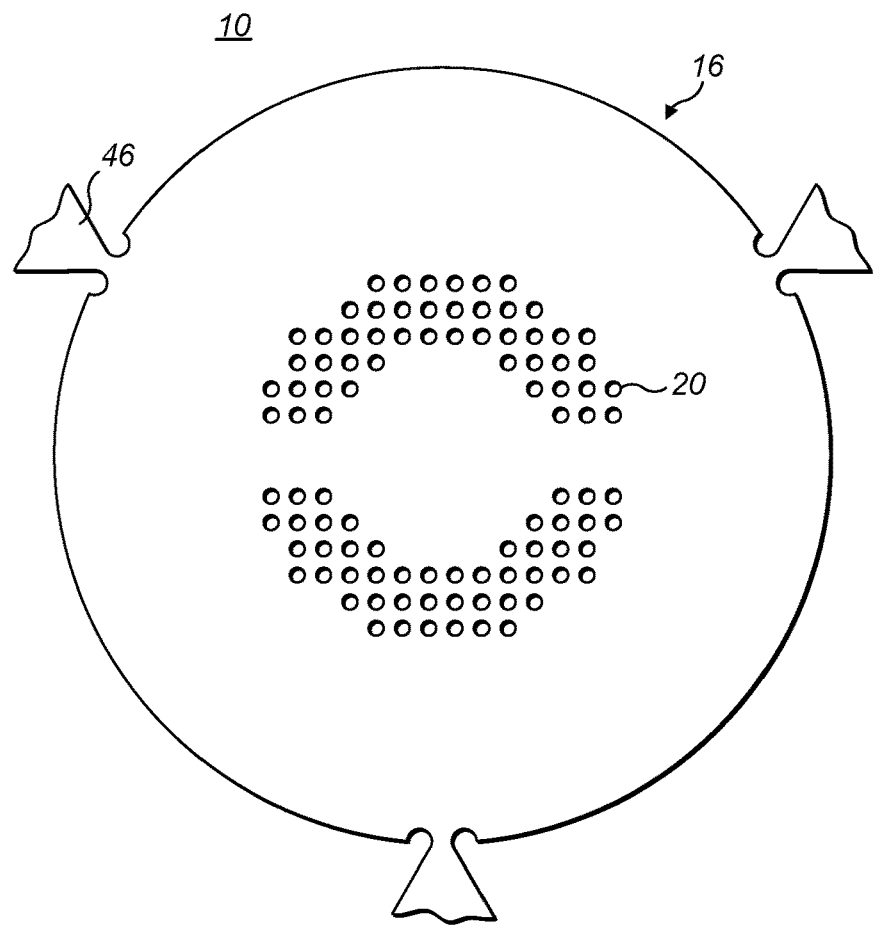
FIGS. 7A and 7B show a schematic top view and a cross-sectional view of an uncoated valve.
Figure 7B:
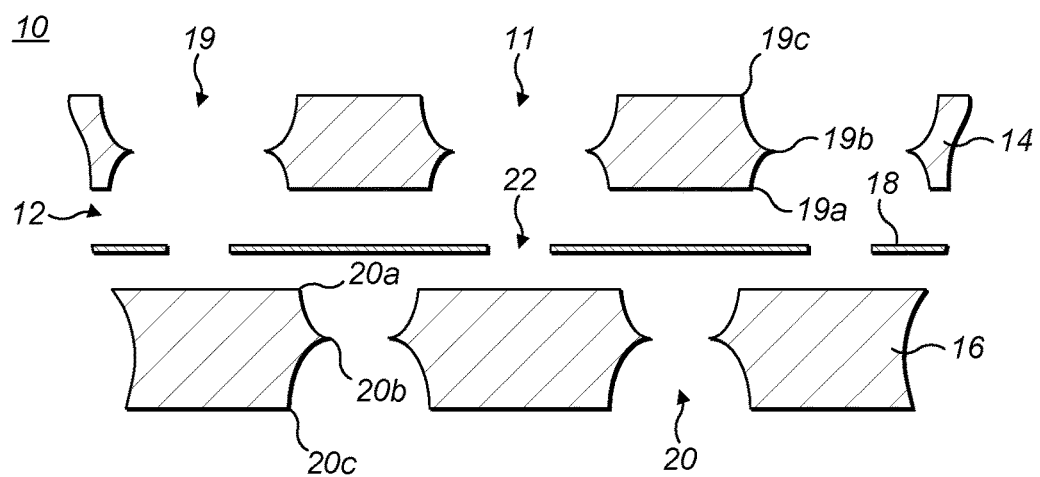

Another aspect of the problem is exemplified in FIGS. 7A and 7B. FIG. 7A shows a top view of a valve 10 suitable for use in the pump 100 of FIG. 2, illustrating the holes 20 in the sealing plate 16. An exploded view of the valve 10 is shown in FIG. 7B, which includes an open plate 14 with holes 19, a sealing plate 16 with holes 20, and a valve flap 18 with holes 22. One embodiment of the valve 10 uses chemical etching to form the open plate 14 and sealing plate 16. The chemical etching process gives rise to hole profiles having typically "sharp" hole edges 19a, 19c, 20a, 20c, and a narrowing of the holes 19, 20 at edges 19b, 20b, as shown in FIG. 7B.

When the valve 10 is in the closed position, with the valve flap 18 in contact or close to the sealing plate 16, there is a high wear point on the valve flap at the edge 20a of the hole 20 in the sealing plate 16. At this edge 20a there is significant physical abrasion on the flap 18 due to the high frequency impact of the flap 18 with the sharp edge 20a of the hole 20. The effect of the fluid pressure on the flap 18 causes the flap 18 to be dragged across the sharp edge and partially into the hole 20 as it is forced against the sealing plate 16. Cyclic fatigue as the flap 18 is repeatedly bent over the edges of the sealing plate 16 also causes increased level of wear.

When the valve 10 is in the open position, with the valve flap 18 in contact or close to the open plate 14, there is a high wear point on the valve flap 18 at the edge 19a of the hole 19 in the open plate 14. At this edge 19a, there is significant physical abrasion on the flap 18 due to the high frequency impact of the flap 18 with the sharp edge 19a of the hole 19.

As mentioned above, to inhibit valve failure, the flap 18 may be protected from the sharp edges 19a, 20a of the holes 19, 20 in the etched plates 14, 16 by applying a coating to at least one of the open plate 14 and sealing plate 16 in the region of the sharp edges 19a, 20a.

In FIG. 8A, the edges 19a, 20a of the holes 19, 20 in the plates 14, 16 are covered by a coating 60, the coating 60 applied to both the open plate 14 and the sealing plate 16. Here, the coating 60 fully covers the surfaces of the plates 14, 16, as well as at least a portion of the inside surfaces of the holes 19, 20 in both plates 14, 16. The coating 60 provides a smooth, rounded surface 61 that covers the otherwise potentially sharp edges 19a, 20a of the holes 19, 20 on the plates 14, 16, thereby providing a protective barrier between the flap 18 and the edges 19a, 20a of the holes 19, 20.

Ideally, both the internal and external surfaces of the plates 14, 16 (i.e. the entire surfaces) are coated, as shown in FIG. 8A. However, it is more important to coat the internal surfaces of the plates 14, 16, and the holes 11, 19, 20, because, in use, the flap 18 will contact the inner edge of the holes 19, 20 on the inner surfaces of the plates 14, 16, as explained previously. It is unlikely that the flap 18 will come into contact with the external surfaces 63 on either the open plate 14 or the sealing plate 16 so coating the external surfaces of the plates 14, 16 may not be considered necessary.

In some aspects, the inner surface of only one of the plates, instead of both plates, may be coated. For example the inner surface of the sealing plate 16 may be coated while the inner surface of the open plate 14 is not. In other aspects, both the internal and external surfaces of one plate will be coated while the internal and external surfaces of the other plate remain uncoated. For example, both the internal and external surfaces of the sealing plate 16 can be coated while the internal and external surfaces of the open plate 14 remain uncoated.

During coating of the plates 14, 16, a mask may be applied to the external surfaces of the plates 14, 16 to prevent the coating 60 from being applied to those exterior surfaces such that only the interior surfaces of the plates 14, 16 and inside the holes 11, 19, 20 are provided with the coating 60, thereby to achieve the configuration shown in FIG. 8B. Alternatively, the entire plate can be covered with the coating 60, which can then be removed from the external surfaces either before or after the valve 10 has been assembled. The coating 60 can be removed using any suitable method, for example laser machining. Leaving the external surfaces of the plates 14, 16 free from a layer of coating 60 can aide assembly of the valve, for example by allowing electrical connections to be made between electrical components and the valve plates 14, 16 for electrical singulation.

Once applied, the coating 60 forms a smooth, continuous layer over the surface of the plates. The coating 60 effectively buries the edges of the holes 11, 19, 20 in the plates 14, 16 that may cause wear or fatigue in the valve flap 18, as shown in FIGS. 8A and 8B; the coating 60 itself does not exhibit any sharp edges or failure locations/defects. The coating 60 may be a "hard" coating, for example comprising Copper or Chromium Nitride, or a "soft" coating, for example comprising Parylene. Ideally, the coating 60 has a thickness that is less than half the diameter of the holes in the plate it is covering so as to prevent the coating 60 from obstructing or blocking the holes.

A soft (e.g. polymeric) coating 60, such as Parylene, may be preferred because the softer material will provide a reduced impact force on the areas of the flap 18 contacting it, with the added benefit of the coating 60 effectively burying the potentially sharp etched edges 19a, 20a of the holes 19, 20 on the plates 14, 16.

Any suitable process can be used to coat the plates including, but not limited to, electroplating, electrodeposition, sputtering, chemical vapour deposition, or spin coating. Areas of the flap 18 can be left free of coating 60, for example by masking pre-coating or selectively removing post-deposition. The coating-free areas may be beneficial making electrical connection; clearing areas ready for laser drilling of holes 22; and bonding (thereby avoiding the risk of delamination when bonding), for example.

The above-described embodiments each disclose ways of removing sharp edges on the plates 14, 16 forming the valve 10. These approaches can be extended to allow improvements to the valve performance through a combination of opening up the flow channel by increasing the channel height without increasing the distance through which the valve flap 18 travels between plates, and allowing air above and below the valve 10 to escape more effectively which increases the response of the valve flap 18. These improvements aim to reduce flow restrictions whilst keeping the valve flap dynamics the same, as will be described in more detail below.

In another example, shown in FIG. 9A, a valve 10 having a new flow structure may comprise a coating 60 similar to the example of FIGS. 8A and 8B. The coating 60 may be selectively applied to or removed from the surface of a plate to create the new flow structure. This arrangement provides the advantage of increasing the maximum height of the flow channel (i.e. the valve cavity 12) while ensuring that the edges of the sealing plate 16 are buried under the smooth coating 60.

In one aspect, this structure may be achieved by applying a layer of coating 60 to the external surface of the sealing plate 16, the internal surface of the sealing plate holes 20, and partially to the internal surface of the sealing plate 16. The "partial" coating 60 on the internal surface of the sealing plate 16 provides a raised sealing edge 74 surrounding each hole 20 on the sealing plate 16. The raised sealing edge 74 acts to protect the valve flap 18 from the edge of the sealing plate hole 20 and provides an end constraint for the valve flap 18 range of motion. The raised sealing edge 74 has a shape that is generally narrower in the flow direction than in the direction perpendicular to the flow direction. The partial coating 60 at the edge of the holes 20 increases the height of the plate 16 and thereby decreases the height of the flow channel (i.e. the valve cavity 12), in that region 70 of the sealing edge 74.

A region of increased channel height 72 is provided between the two plates 14, 16 where the internal surface of the sealing plate 16 is devoid of coating 60. This region 72 surrounds the holes (and hence the raised sealing edge 74) on the sealing plate 16, as shown in FIG. 9B. Here, "outside" means any part of the sealing plate 16 that is separated from the sealing plate hole 20 by the raised sealing edge 74. As can be seen in FIG. 9B, the raised sealing edge 74 has a substantially annular shape (e.g. similar to the shape of the hole 20) and the remainder of the surface of the sealing plate 16 forms the region of increased channel height 72.

The region of increased sealing plate height 70 means that the distance over which the flap 18 has to travel between the open plate 14 and the raised sealing edge 74 has not been increased even though the channel height has increased. This configuration therefore provides reduced flow restrictions without increasing the distance over which the flap 18 has to travel between the two plates 14, 16.

To ensure that the flap 18 is sufficiently supported over the region of increased channel width 72, this area can include a number of support structures 76, an example of such features being shown in FIG. 9C. Here, the support structures may comprise four pairs of elongate portions 76 of coating 60, for example, spaced equally around the sealing edge 74 with the elongate portions 76 extending away from the circular sealing edge 74 in a generally perpendicular direction. Ideally, the support structures 76 are evenly distributed within the region of increased channel height 72 so that the flap 18 is evenly supported across the valve 10 structure without substantially increasing flow restrictions.

The support structures 76 can be created by applying a coating to the internal surface of the sealing plate 16 and then selectively removing parts of the coating using, for example, laser machining or lithography. Alternatively, the structures 76 can be created by selectively applying a coating to the internal surface of the sealing plate 16 by, for example, selectively growing or printing a coating on the desired areas. In some cases a mask is applied to certain areas of the sealing plate 16 which are to be left uncovered, the sealing plate 16 is then coated, and the mask is subsequently removed. The coating 60 used can be the same coating as described with respect to FIGS. 8A and 8B.

As well as providing raised support structures 76 on the sealing plate 16, as shown in FIG. 9C, additional structures can also be provided on the open plate 14, an example of which features are shown in FIG. 10A. These structures constrain the motion of the valve flap 18 whilst allowing air to move more freely above the flap 18 as it opens. The additional structures are created in a similar manner to the support structures 76 on the sealing plate 16 described in relation to FIG. 9A. That is, the open plate 14 is covered in a coating 60, which is then selectively removed from parts of the internal surface of the open plate 14 to create the desired structure.

These additional structures can take on variety of different forms including flow channels 80, for example as shown surrounding the release hole 11 in FIG. 10B, or an array of protrusions (or "islands") of coating 82, for example as shown surrounding the release hole 11 in FIG. 10C.

FIG. 11A illustrates a valve 10 having a combination of a support layer 90, the coating 60 described in relation to FIGS. 8A and 8B, and the raised sealing edge 74 described in relation to FIGS. 9A-9C. Advantageously, this combination of different structures protects the valve flap 18 from the hole edges in the sealing plate 16 whilst providing support for the valve flap 18 across the valve 10. This combination of features provides the potential for smaller holes to be present in the sealing plate 16 because it is possible to etch smaller holes into the thinner material of the support structure. In this implementation, the support structure includes a metal support layer (made up of a layer of metal 20 µm in thickness and a hole diameter of 100 µm) which reduces stress across the unsupported span. This metal support layer is then also coated in order to prevent sharp edges from cutting into the valve flap 18.

It is also possible to combine the additional support structures present on the open plate 14, as described in relation to FIGS. 10B and 10C, with the structure shown in FIG. 11A.

FIG. 11B shows a valve 10 structure similar to that shown in FIG. 11A, except that only the support layer 90 is coated, rather than the sealing plate 16 and part of the support layer 90. The support layer 90 is bonded to the sealing plate 16 after it has been coated.

FIG. 12 shows a modified valve 10 structure in which the inner surfaces of both the open plate 14 and the sealing plate 16 have been treated to round off the edges 30 of the holes 11, 19 in the open plate and the edges 28 of the holes 20 in the sealing plate 16. In doing so, sharp edges caused by the etching process when creating the holes 11, 19, 20 are removed. A coating 60 has also been applied over the surface of the plates 14, 16. The rounded edges 28, 30 are thereby on the inner surface of each plate 16, 14 onto which the flap 16 comes into contact (or impacts), in use, i.e. on the inner surfaces of both the open plate 14 and the sealing plate 16. Rounding the inner edges of both plates 14, 16 may also result in reduced flow restrictions as the fluid flows through the cavity 12 from one side of the valve 10 to the other side. The addition of the coating 60 further reduces the forces applied to the flap 18 when it impacts the sealing plate 16 or open plate 14. In some embodiments, the outer edges 34 of the open plate 14 and/or the outer edges 32 of the sealing plate 16 may be rounded, in addition to the inner edges. Techniques for rounded the edges of the holes in the plates include a secondary etching process, electro-polishing, laser ablation, plasma treatment, or using a different fabrication method such as electroforming.

FIG. 13 shows an example of a valve 10 in which a new flow structure has been created by selectively removing material from the sealing plate 16, to create a recess 62 in the sealing plate 16, and then applying a coating 60. The recess 62 can reduce flow restrictions by providing a larger area through which fluid can flow through the valve 10. That is to say, the channel height, which corresponds to the width of the valve cavity 12 (i.e. defined between the inner surfaces of the open plate 14 and sealing plate 16), has been effectively increased. The coating 60 provides protection of the flap 18 from the sharp inner edges 20a and 20d of the sealing plate 16.

As can be seen in FIG. 13, by creating a recess 62 in the sealing plate 16, the sealing plate 16 has a region of increased height 64 with respect to the rest of the surface of the sealing plate 16. The region of increased height 64 means that the distance over which the flap 18 has to travel between the open plate 14 and the sealing plate 16 has not been increased due to the presence of the recess 62. Thus, this configuration reduces flow restrictions but keeps the valve flap 18 dynamics substantially the same as described previously.

The region of increased height 64 forms a sealing edge 66 on the sealing plate 16 which provides one end constraint for the motion of the valve flap 18. The sealing edge 66 has a shape that is generally narrower in the flow direction than in the direction perpendicular to the flow direction.

The recess 62 is created by selectively removing part of the surface of the sealing plate 16 from a region outside the sealing edge 66. In this context, "outside" refers to any part of the sealing plate 16 that is separated from the sealing plate hole 20 by the sealing edge 66.

Figure 14A:
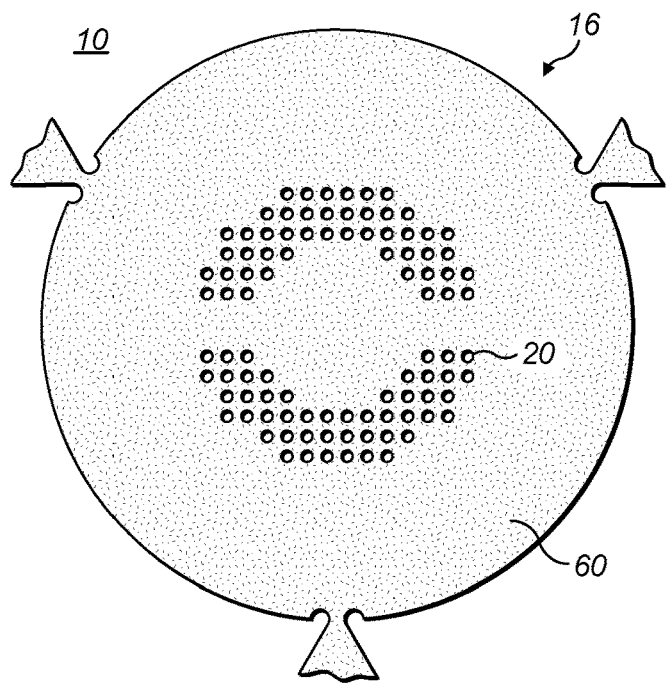
FIGS. 14A-14C show a yet further embodiment of a coated valve.
Figure 14B:
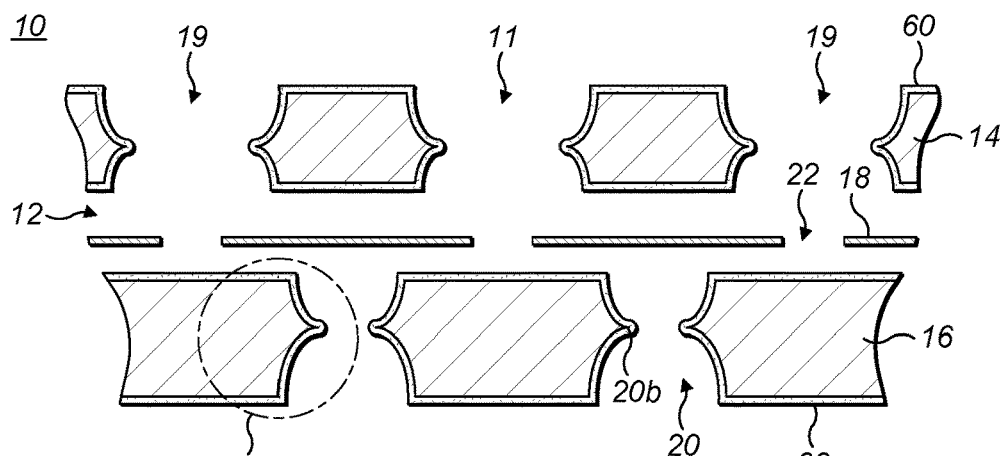
Figure 14C:
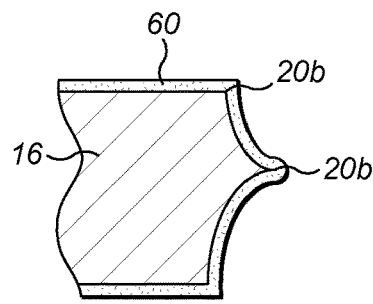

FIG. 14A shows a schematic top view of a sealing plate 16 having a plurality of holes 20 with a coating 60 applied across all surfaces of the plate. FIG. 14B shows the coating 60 applied evenly across all surfaces of the sealing plate 16 and open plate 14, respectively. FIG. 14C shows a detailed view of the coating 60 applied over the sharp etched edge 20a of hole 20 in the sealing plate 16. This coating 60 provides a rounded edge and compliant surface which will reduce the rate of deceleration of the valve flap 18 when it hits the sealing plate 16. The coating 60 also provides a sacrificial layer which may be softer than the valve flap 18, and which will wear preferentially to the valve flap 18. The coating 60 applied to the open plate 14 may provide similar features and effects. In one embodiment of the valve 10, the coating 60 may be vacuum-deposited Parylene or another soft polymeric material.

Preferably, the thickness of the coating 60 may be less than the radius of the holes 20 in the sealing plate 16 to prevent the holes closing at the narrowed region 20b. The coating may have a thickness of less than 100 µm, more preferably a thickness of less than 10 µm, and even more preferably a thickness of around 4 µm.

The coating 60 has been found to provides significant improvements to the lifetime of the flap 18, and hence the valve 10 and any pump 100 into which it is fitted.

A potential challenge created by the provision of such coating, however, is assembly of the valve, specifically where thermal conduction is required for laser welding the various plates together or where electrical connections are required to the plates or leadframe to carry out electrical singulation of the valve from the leadframe as described previously. A further processing challenge relates to the creation of the holes 22 in the flap 18. In one embodiment, the holes 22 are formed by UV laser ablation of selective regions of the flap 18 while it is resting against the sealing plate 20. The presence of a (e.g. Parylene) coating 60 in contact with the underside of a (e.g. Polyethylene terephthalate (PET)) valve flap 18 can lead to mixing or weak adhesion of the two polymeric materials at the edges of the hole 22 during the UV ablation, which may reduce the mobility and response spend of the flap 18.

To reduce the impact on valve and pump assembly, areas of coating (e.g. Parylene) may be selectively absent, thinned, altered or removed from the valve plates. This may be achieved by any appropriate technique, including, but not limited to masking during coating, selective coating, removal by laser ablation, melting, abrasion, or etching.

Figure 15A:
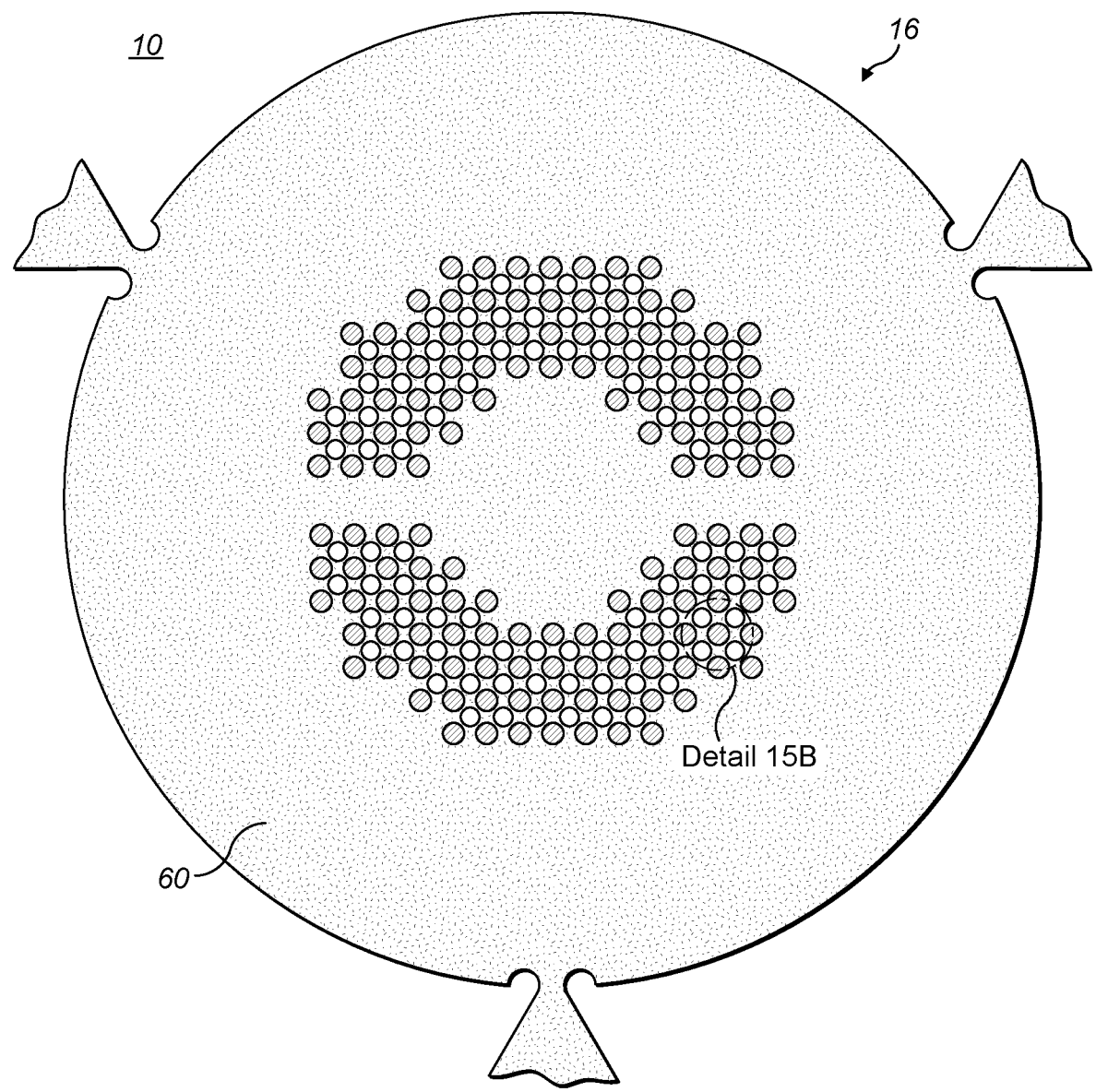
FIGS. 15A-15C show another embodiment of a coated valve having selective areas of the coating removed.
Figure 15B:
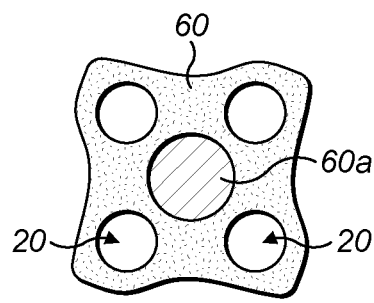
Figure 15C:
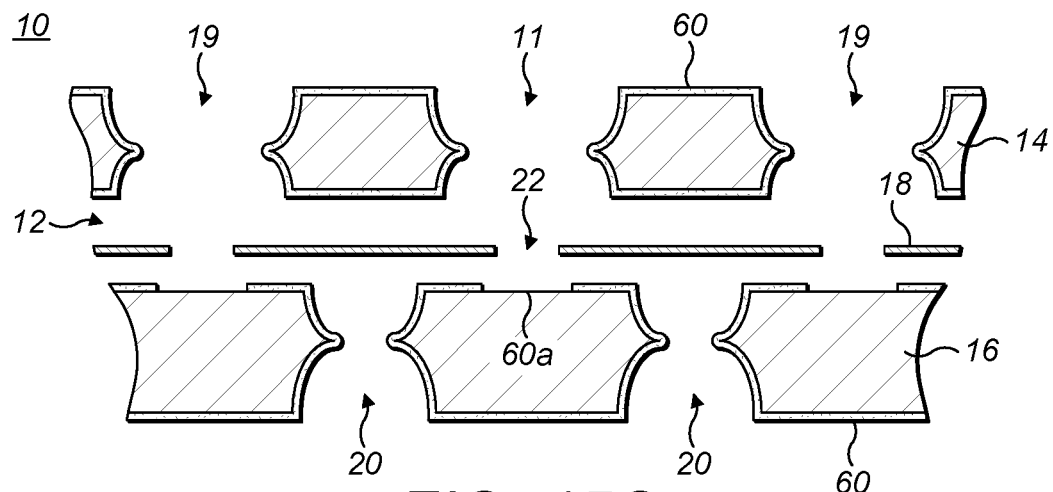

FIGS. 15A, 15B and 15C show one embodiment of the valve 10 which solves some of the aforementioned issues. In this embodiment, regions 60a of the coating 60 on the sealing plate 16 are partially or fully absent in the regions where the holes 22 in the flap 18 will be formed.

FIG. 15A shows a top view of the sealing plate 16 with a coating 60 applied, but with some regions 60a of the coating 60 removed. FIG. 15B shows an enlarged unit cell of the pattern in FIG. 15A. FIG. 15C shows a cross section of a valve which incorporates the structure shown in FIG. 15A, and shows the regions 60a of the coating 60 which are absent or thinned. In this embodiment the regions 60a are substantially aligned with the holes 22 in the valve flap 18, and are larger in diameter than the holes 22 in the valve flap 18. This has the effect of preventing the formation of any unintentional bond between the valve flap 18 and the coating 60 during UV laser ablation of the holes 22 in the valve flap 18.

More generally, the regions 60a of the coating 60 may be larger, smaller or the same size as the holes 22 in the flap 18, and may be any appropriate shape.

Figure 16A:
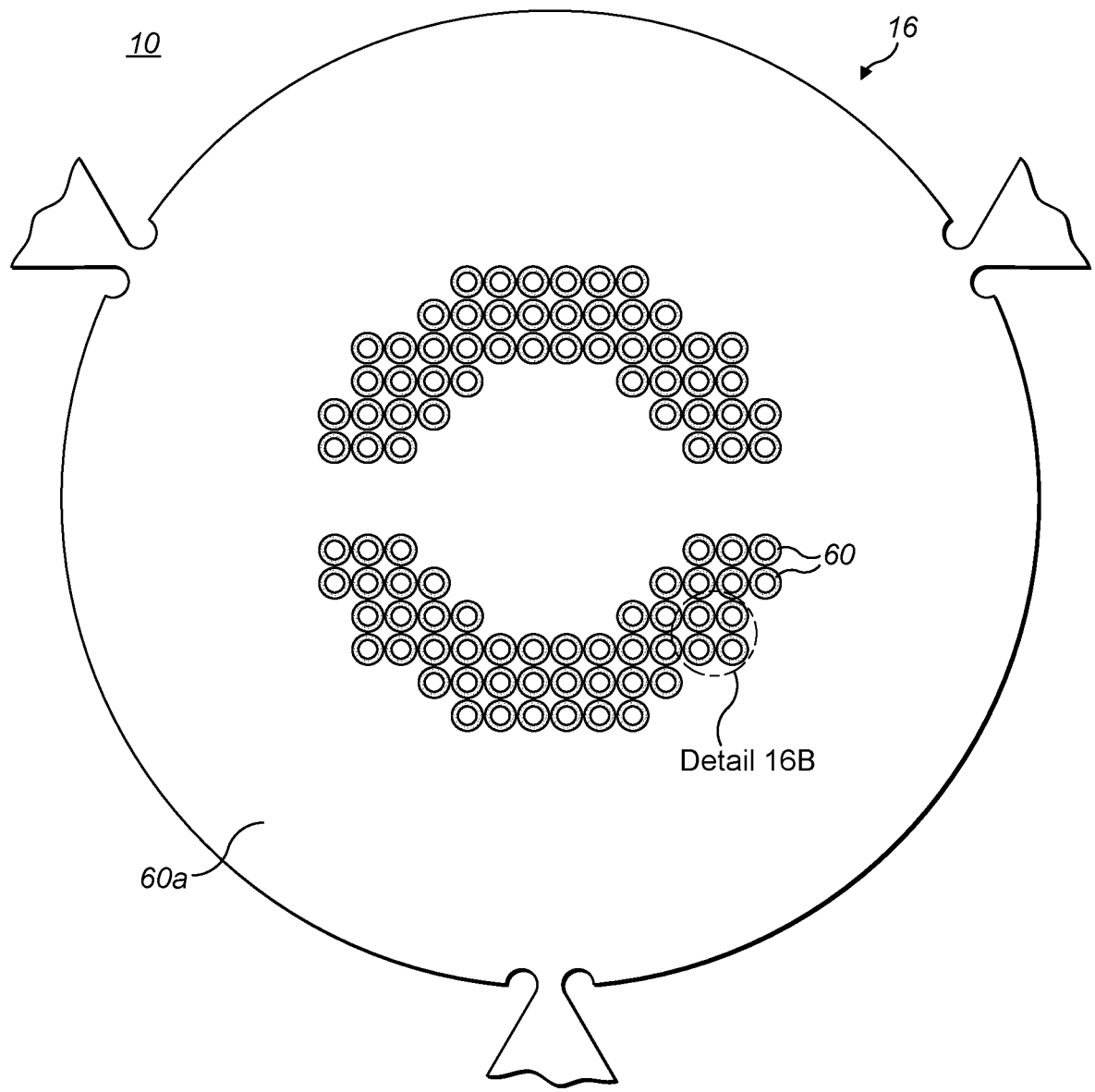
FIGS. 16A-16C show another embodiment of a coated valve having selective areas of the coating removed.
Figure 16B:
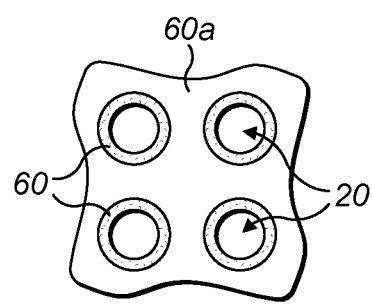
Figure 16C:
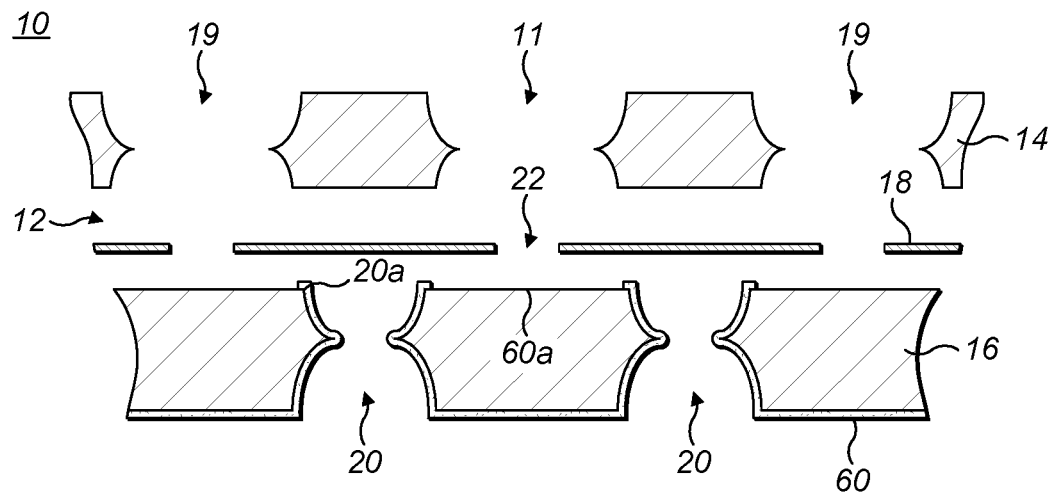

FIGS. 16A, 16B and 16C show an alternative embodiment of a valve 10 in which the coating is absent, removed, thinned or altered across the majority of the inner surface of the sealing plate 16, and is present only in the regions adjacent the holes 20 required to prevent fatigue of the flap 18 against the sealing hole edge 20*a*.

FIG. 16A shows a top view of the sealing plate 16 with a coating 60 applied, but with large regions 60*a* of the coating 60 removed. FIG. 16B shows an enlarged unit cell of the pattern in FIG. 16A. FIG. 16C shows a cross section of a valve 10 which incorporates the structure shown in FIG. 16A, and shows the regions 60*a* of the coating 60 which are absent or thinned. In this embodiment the open plate 14 does not have a coating applied. In alternative embodiments the open plate 14 may have a coating 60 applied, with or without regions 60*a* thinned or absent.

The pattern of coating and thinners or absent coating 60*a* shown in FIGS. 16A and 16B may be applied to either side of the sealing plate 16 and the approach may be applied to either side of the open plate 14 with the coating 60 removed from all areas except close to the edge of the holes 19 and release hole 11.

Figure 17:
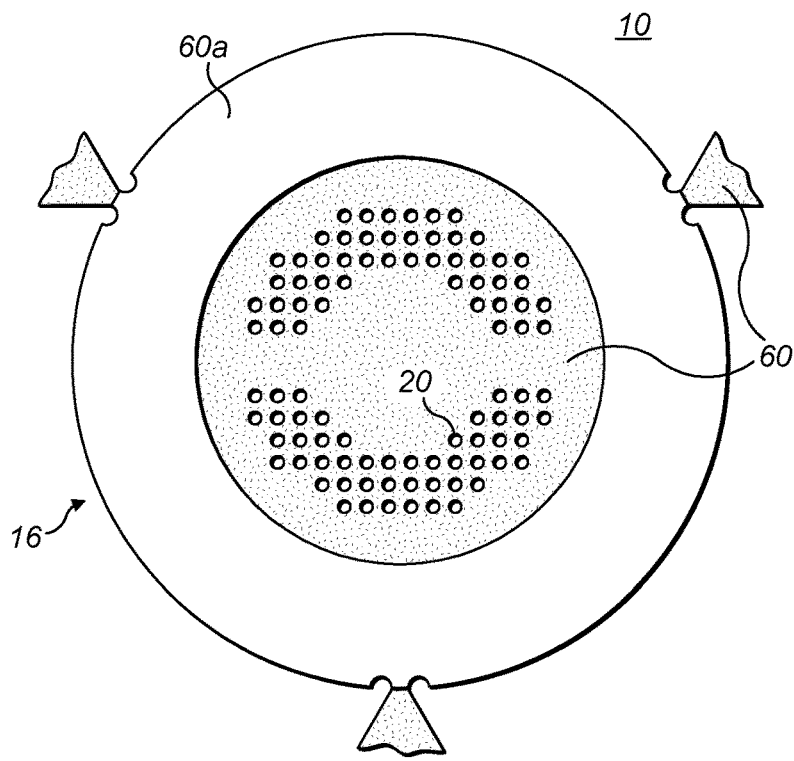
FIG. 17 shows a yet another embodiment of the coated valve having selective areas of the coating removed.

FIG. 17 shows a pattern of coating and absent regions 60*a* which may be applied to the external surface of the sealing plate 16. Here, the external surface refers to the surface on the outside of the valve 10 once it has been assembled. This pattern provides an annular region which may be used to provide an electrical connection to the valve plates during electrical singulation as described earlier. This pattern may be applied to one or both of the sealing plate 16 and open plate 14 to provide electrical connection to one or both of the plates.

Figure 18:
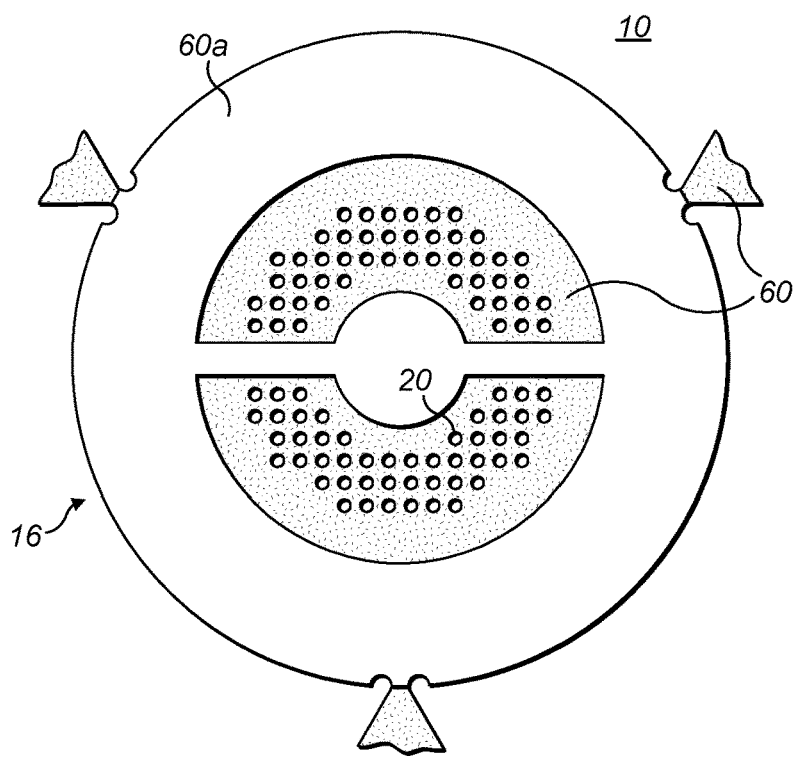
FIG. 18 shows a further yet another embodiment of a coated valve having selective areas of the coating removed.

FIG. 18 shows an embodiment in which the coating is absent, removed or thinned from the internal surface of the sealing plate 16 in the regions which would be in contact with the side wall 13 when the valve 10 is assembled. This reduces the insulating barrier between the side wall 13 and the sealing plate 16, and reduces the difficulty of creating drag welds 38 required to assemble the valve 10. The same approach can be applied to the internal surface of the open plate 14 for the same reasons.

In one particular embodiment of the valve 10, the pattern shown in FIG. 15A may be applied to the internal surface of the sealing plate 16, the pattern in FIG. 17 may be applied to the external surfaces of the sealing plate 16 and open plate 14 and the pattern in FIG. 18 may be applied to the internal surfaces of the sealing plate 16 and open plate 14. In this example all the aforementioned processing challenges are addressed providing a robust valve 10 which can be processed effectively.

FIGS. 19A-19F show the pump 100 of FIG. 1 in outline schematic form with alternative configurations (i.e. pumps 100A-100F) of its apertures and valves according to the present invention. For simplicity, the structure of the pump 100 is only labelled in detail in FIG. 19A for pump 100A, though the same pump structure is present in each of the alternative configurations described below.

Figure 19A:
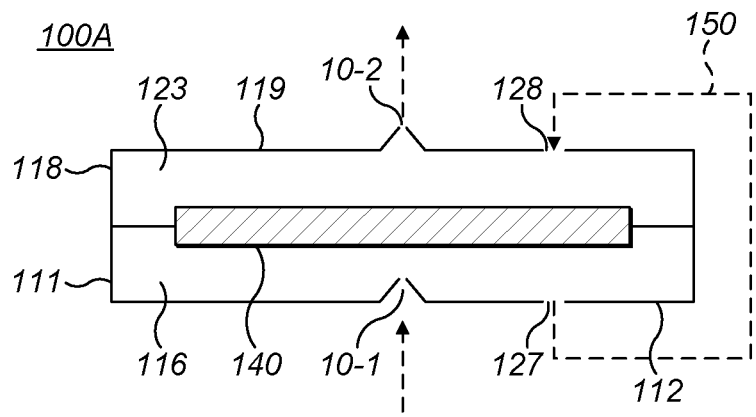
FIGS. 19A-19F show alternative configurations for the two-cavity pump.

The embodiment of FIG. 19A shows a pump 100A similar to the pump 100 of FIG. 1 in which first and second valves 10-1, 10-2 are provided, respectively, in the first and second bases 112, 119 that define the cavities 116, 123. The two valves 10-1, 10-2 are located close to the centres of the respective first and second bases 112, 119. The first valve 10-1 is oriented to allow fluid through it and into the (first) pump cavity 116 while the second valve 10-2 is oriented to allow fluid through it and out of the (second) pump cavity 123. In the embodiment, the secondary apertures 127, 128 are unvalved, disposed offset from the centre of their respective bases 112, 119 and are also joined by a, preferably pneumatic, manifold 150. The two valves 10-1, 10-2 each provide half-wave rectification of the pressure waves in cavities 116, 123 respectively. This configuration provides a convenient method of connecting the two cavities 116, 126 of the pump 100A in series in order to provide higher pressures than can be achieved with a single cavity.

Figure 19B:
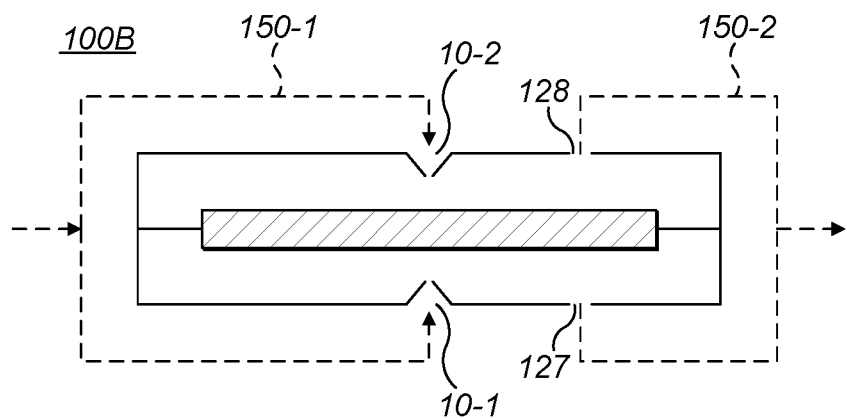

FIG. 19B shows a pump 100B similar to the pump 100 of FIG. 1 in which first and second valves 10-1, 10-2 are provided, respectively, in the first and second bases 112, 119 that define the cavities 116, 123. The two valves 10-1, 10-2 are located close to the centres of the first and second bases 112, 119 that define the respective cavities 116, 123. In the embodiment, the two valves 10-1, 10-2 are both oriented to allow fluid through them and into the cavities 116, 123 respectively. The primary apertures containing the two valves 10-1, 10-2 are joined by a, preferably pneumatic, first manifold 150-1 which also provides the pump inlet. The secondary apertures 127, 128 are unvalved, disposed offset from the centre of their respective bases 112, 119 and are connected by a, preferably pneumatic, second manifold 150-2 which provides the pump outlet. Similar to the pump 100A of FIG. 19A, the two valves 10-1, 10-2 each provide half-wave rectification of the pressure waves in the two pump cavities 116, 123 respectively. The configuration of the pump 100B of FIG. 19B provides a convenient method of connecting the two cavities 116, 123 in parallel in order to provide higher flow rates than can be achieved with a single cavity.

Figure 19C:
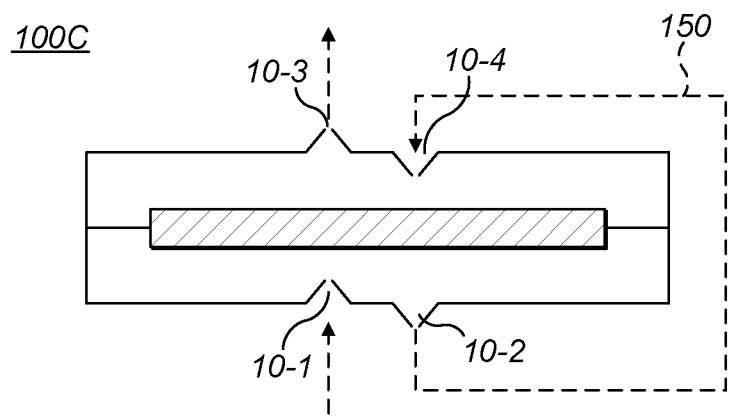

FIG. 19C shows a variant of a pump 100C similar to the pump 100 of FIG. 1, in which first and second valves 10-1, 10-2 are provided in two separate apertures in the first base 112 and provide full wave-rectification of the pressure waves in the first cavity 116. Similarly, third and fourth valves 10-3, 10-4 are provided in two separate apertures in the second base 119 and provide full-wave rectification of the pressure waves in the second cavity 123. Each valve 10-1, 10-2, 10-3, 10-4 is located close to the centre of the first and second bases 112, 119, respectively, which define the respective cavity 116, 123. The first valve 10-1 and the fourth valve 10-4 are both oriented to allow fluid into the cavities 116, 123, respectively, while the second valve 10-2 and the third valve 10-3 are oriented to allow fluid out of the cavities 116, 123, respectively. The apertures containing the second and fourth valves 10-2, 10-4 are joined by a, preferably pneumatic, manifold 150. This configuration of a pump 100C provides another convenient method of connecting the two cavities 116, 123 in series to provide higher pressures than can be achieved with a single cavity.

Figure 19D:
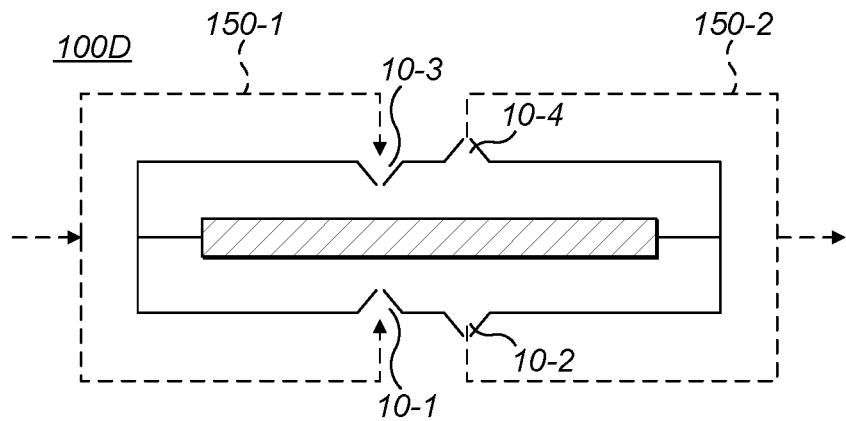

FIG. 19D shows a further variant of a pump 100D similar to the pump 100 of FIG. 1. In this embodiment, first and second valves 10-1, 10-2 are provided in the first base 112. Each of the two valves 10-1, 10-2 is located close to the centre of first base 112. The first valve 10-1 is oriented to allow fluid into cavity 116 while the second valve 10-2 is oriented to allow fluid out of the cavity 116. Two further (i.e. third and fourth) valves 10-3, 10-4 are provided in the second base 119. Each of the third and fourth valve 10-3, 10-4 is located close to the centre of the second base 119 that defines the cavity 123. The third valve 10-3 is oriented to allow fluid into cavity 123 while the fourth valve 10-4 is oriented to allow fluid out of the cavity 123. A, preferably pneumatic, first manifold 150-1 provides the pump inlet and joins the first and third valves 10-1, 10-3 while a, preferably pneumatic, second manifold 150-2 provides the pump inlet and joins the second and fourth valves 10-2, 10-4. The configuration of a pump 100D shown in FIG. 19D provides a convenient method of connecting the two cavities 116, 123 in parallel to provide higher flow rates, than those which can be achieved with a single cavity, where the valves 10-1, 10-2, 10-3, 10-4 provide full-wave rectification of the pressure waves in the two cavities 116, 123 respectively. In different embodiments the first and second valves 10-1, 10-2 may be separate valves or a combined structure, similarly the third and fourth valves 10-3, 10-4 may also be separate valves or a combined structure.

Figure 19E:
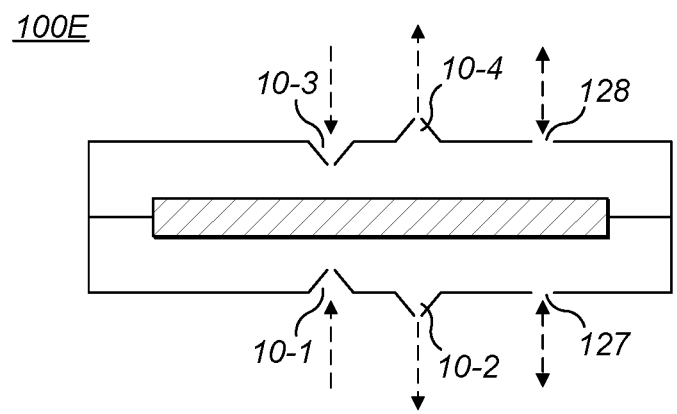

In the alternative configuration shown in FIG. 19E of a pump 100E similar to the pump 100 of FIG. 1, first and second valves 10-1, 10-2 are provided in the first base 112 that defines the first cavity 116. Each of the two valves 10-1, 10-2 is located close to the centre of the first base 112. The first valve 10-1 is oriented to allow fluid to enter the cavity 116 while the second valve 10-2 is oriented to allow fluid out of the cavity 116. Two further (i.e. third and fourth) valves 10-3, 10-4 are provided in the second base 119 that defines the second cavity 123. Each of the third and fourth valves 10-3, 10-4 is located close to the centre of the second base 119. The third valve 10-3 is oriented to allow fluid to enter the cavity 123 while the fourth valve 10-4 is oriented to allow fluid out of the cavity 123. Secondary apertures 127, 128 are unvalved and disposed offset from the centre of their respective bases 112, 119. The valves 10-1, 10-2, 10-3, 10-4 provide full-wave rectification of the pressure waves in the two cavities 116, 123 respectively. This configuration of the pump 100E enables bidirectional flow at secondary aperture 127 which can be controlled by selectively blocking or opening the apertures connected to either the first valve 10-1 or the second valve 10-2 respectively. The bidirectional flow can be enabled at secondary aperture 128 by controlling the third and fourth valves 10-3, 10-4 in the same (or a similar) manner. The configuration also allows the simultaneous generation of positive pressure at the apertures containing the second and fourth valves 10-2, 10-4 and reduced pressure at the apertures containing the first and third valves 10-1, 10-3.

Figure 19F:
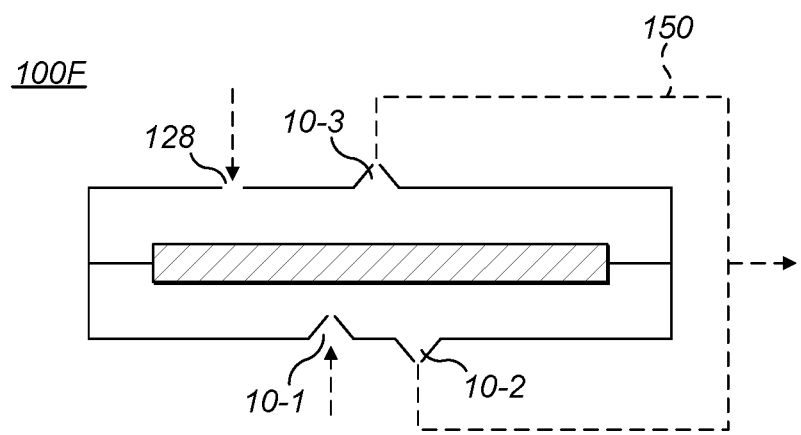

FIG. 19F shows another alternative configuration of a pump 100F similar to the pump 100 of FIG. 1, in which first and second valves 10-1, 10-2 are provided in the first base 112 that defines the first cavity 116. Each of the first and second valves 10-1, 10-2 is located close to the centre of the first base 112. The first valve 10-1 is oriented to allow fluid to enter the cavity 116 while the second valve 10-2 is oriented to allow fluid out of the cavity 116. A third valve 10-3 is provided in the second base 119 that defines cavity 123. The third valve 10-3 is located close to the centre of the second base 119, and oriented to allow fluid out of the cavity 123. At least one unvalved, secondary aperture 128 is also provided in the second base 119 to allow fluid freely to enter or exit the cavity 123. The secondary unvalved aperture 128 is disposed offset from the centre of the second base 119. Preferably, there are a plurality of secondary unvalved apertures 128 provided in the second base 119. The apertures containing the second and third valves 10-2, 10-3 are joined by a, preferably pneumatic, manifold 150 which also provides the pump outlet. The first and second valves 10-1, 10-2 provide full-wave rectification of the pressure wave in cavity 116 while the third valve 10-3 provides half-wave rectification of the pressure wave in cavity 123. This configuration enables an alternative balance of pressure and flow to that described in previous embodiments.

In each of the two-cavity pumps 100A-100F, described above and shown in FIGS. 19A-19F, it is possible to create alternative embodiments by, for example, reversing the direction of the valves, using different manifold arrangements, either full-wave or half-wave rectifying each cavity, moving the position of the valved or unvalved apertures within the cavities and by adding extra valves or unvalved apertures.

As previously noted, it will be understood that the present invention has been described above purely by way of example, and modifications of detail can be made within the scope of the invention. Thus, while the foregoing is directed to exemplary aspects and embodiments of the present invention, other and further aspects and embodiments of the invention will be apparent to those skilled in the art from consideration of the specification, and may be devised without departing from the basic scope thereof, which is determined by the claims that follow.

The aspects and embodiments disclosed herein are described in sufficient detail to enable those skilled in the art to practice the invention, and it is understood that other embodiments may be utilized and that logical structural, mechanical, electrical, and chemical changes may be made without departing from the scope of the invention.

The invention claimed is:

1. A valve for controlling fluid flow, the valve comprising:
a first plate comprising a plurality of first holes extending generally perpendicular through said first plate;
a second plate comprising a plurality of second holes extending generally perpendicular through said second plate, the second holes being substantially offset from the first holes of said first plate;
a spacer disposed between said first plate and said second plate to form a cavity therebetween in fluid communication with the first holes of said first plate and the second holes of said second plate;
a flap disposed and moveable between said first plate and said second plate, the flap having holes substantially offset from the first holes of said first plate and substantially aligned with the second holes of said second plate;
wherein the flap is operable to be motivated between said first and second plates in response to a change in direction of a differential pressure of the fluid across the valve;
wherein at least one of said first plate or said second plate has a coating arranged to control the distribution of one or more forces asserted on the flap when the flap impacts or is in contact with said first plate or second plate by controlling areas of the flap over which said forces are asserted to inhibit wear of the flap at said areas; and
wherein the coating extends at least partially across an internal surface of at least one of said first plate or second plate, and extends at least partially into the holes of said first plate or second plate to cover at least part of an internal surface of said holes.

2. The valve of claim 1, wherein said areas of the flap over which said forces are asserted are areas of the flap that impact or contact regions of said first or second plate adjacent the first holes or the second holes, wherein said regions of said first or second plate are edges of the first holes or the second holes.

3. The valve of claim 1, wherein the coating extends at least partially across an external surface of at least one of said first plate or second plate.

4. The valve of claim 3, wherein the coating is at least partially removed in one or more patterned regions on an external surface of at least one of the first and second plates so as to aide valve assembly.

5. The valve of claim 1, wherein the coating extends at least partially across an internal surface of the other of said first or second plate, and extends at least partially into the holes of the other of said first or second plate to cover at least part of an internal surface of said holes.

6. The valve of claim 1, wherein a thickness of the coating is less than 100 µm, less than 10 µm, and around 4 µm.

7. The valve of claim 1, wherein the coating is arranged to provide at least one region of increased height on a surface of said first or second plate, said at least one region being of increased height with respect to the rest of the surface of said first or second plate, wherein the at least one region of increased height forms at least part of an edge of a hole in said first or second plate.

8. The valve of claim 7, wherein the at least one region of increased height is on an inner surface of said first or second plate, and wherein the surface of said first or second plate surrounding the at least one region of increased height is recessed.

9. The valve of claim 7, wherein the at least one region of increased height is at least in part provided by a raised support layer disposed on the surface of said first or second plate.

10. The valve of claim 9, wherein the raised support layer is at least partially covered by the coating, and wherein the coating completely covers the raised support layer; and more wherein the coating extends into the holes in said first or second plate such that it at least partially covers an internal surface of the holes.

11. The valve of claim 1, wherein the coating comprises a polymer.

12. The valve of claim 1, wherein said first plate and said second plate both comprise said coating.

13. The valve of claim 1, wherein the flap comprises Polyethylene terephthalate (PET).

14. A pump comprising at least one valve according to claim 1.

15. A method of providing a valve according to claim 1, the method comprising: prior to assembling components of the valve, applying a coating onto a surface of at least one of said first plate or second plate such that the coating extends at least partially across the surface of said first plate or second plate.

16. The valve of claim 1, wherein said coating comprises a first area and a second area, and wherein said coating is selectively thinned in said second area.

17. A valve for controlling fluid flow, the valve comprising:
    a first plate comprising a plurality of first holes extending generally perpendicular through said first plate;
    a second plate comprising a plurality of second holes extending generally perpendicular through said second plate, the second holes being substantially offset from the first holes of said first plate;
    a spacer disposed between said first plate and said second plate to form a cavity therebetween in fluid communication with the first holes of said first plate and the second holes of said second plate;
    a flap disposed and moveable between said first plate and said second plate, the flap having holes substantially offset from the first holes of said first plate and substantially aligned with the second holes of said second plate;
    wherein the flap is operable to be motivated between said first and second plates in response to a change in direction of a differential pressure of the fluid across the valve;
    wherein at least one of said first plate or said second plate has a coating arranged to control the distribution of one or more forces asserted on the flap when the flap impacts or is in contact with said first plate or second plate by controlling areas of the flap over which said forces are asserted to inhibit wear of the flap at said areas; and
    wherein the coating or a further coating has a thickness that is equal to less than half the diameter of the first holes or the second holes on said first or second plate on which said coating is applied.

18. A valve for controlling fluid flow, the valve comprising:
    a first plate comprising a plurality of first holes extending generally perpendicular through said first plate;
    a second plate comprising a plurality of second holes extending generally perpendicular through said second plate, the second holes being substantially offset from the first holes of said first plate;
    a spacer disposed between said first plate and said second plate to form a cavity therebetween in fluid communication with the first holes of said first plate and the second holes of said second plate;
    a flap disposed and moveable between said first plate and said second plate, the flap having holes substantially offset from the first holes of said first plate and substantially aligned with the second holes of said second plate;
    wherein the flap is operable to be motivated between said first and second plates in response to a change in direction of a differential pressure of the fluid across the valve;
    wherein at least one of said first plate or said second plate has a coating arranged to control the distribution of one or more forces asserted on the flap when the flap impacts or is in contact with said first plate or second plate by controlling areas of the flap over which said forces are asserted to inhibit wear of the flap at said areas; and
    wherein the coating is at least partially removed in one or more patterned regions on an internal surface of at least one of the first and second plates so as to aide valve assembly, wherein the one or more patterned regions lie between the holes in the first and/or second plate such that the coating surrounds the holes.

19. The valve of claim 18, wherein the one or more patterned regions are arranged to form one or more raised sealing edges on the first and/or second plate.

20. The valve of claim 18, wherein the one or more patterned regions are arranged to form one or more additional structures on at least one of the first plate or second plate, wherein the one or more additional structures include at least one of a flow channel or a projection.

* * * * *